United States Patent
Matsumura et al.

(10) Patent No.: US 11,632,164 B2
(45) Date of Patent: Apr. 18, 2023

(54) USER TERMINAL AND RADIO COMMUNICATION METHOD

(71) Applicant: NTT DOCOMO, INC., Tokyo (JP)

(72) Inventors: Yuki Matsumura, Tokyo (JP); Satoshi Nagata, Tokyo (JP); Jing Wang, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 17/290,465

(22) PCT Filed: Nov. 2, 2018

(86) PCT No.: PCT/JP2018/040902
§ 371 (c)(1),
(2) Date: Apr. 30, 2021

(87) PCT Pub. No.: WO2020/090119
PCT Pub. Date: May 7, 2020

(65) Prior Publication Data
US 2021/0409098 A1 Dec. 30, 2021

(51) Int. Cl.
*H04B 7/08* (2006.01)
*H04L 27/26* (2006.01)
*H04W 28/18* (2009.01)

(52) U.S. Cl.
CPC ....... *H04B 7/0834* (2013.01); *H04L 27/2602* (2013.01); *H04W 28/18* (2013.01)

(58) Field of Classification Search
CPC .......... H04L 27/2602; H04W 72/042; H04W 48/12; H04W 28/18; H04B 7/0834
See application file for complete search history.

(56) References Cited

U.S. PATENT DOCUMENTS

| | | | |
|---|---|---|---|
| 2020/0053757 A1* | 2/2020 | Bagheri | H04W 24/08 |
| 2020/0100311 A1* | 3/2020 | Cirik | H04B 7/0695 |
| 2021/0119688 A1* | 4/2021 | Enescu | H04L 5/0048 |
| 2021/0306867 A1* | 9/2021 | Hamidi-Sepehr | H04W 72/046 |

OTHER PUBLICATIONS

Qualcomm, "maintenance on Reference signals and QCL", 3GPP TSG RAN WG1 Meeting #94bis R1-1811232, pp. 1-16, Oct. 8-12, 2018. (Year: 2018).*
International Search Report issued in PCT/JP2018/040902 dated Jan. 22, 2019 (1 page).
Written Opinion of the International Searching Authority issued in PCT/JP2018/040902 dated Jan. 22, 2019 (3 pages).
(Continued)

*Primary Examiner* — Rahel Guarino
(74) *Attorney, Agent, or Firm* — Osha Bergman Watanabe & Burton LLP

(57) ABSTRACT

To switch a TCI state, QCL assumption, or a beam of a channel at high speed, a user terminal according to one aspect of the present disclosure includes: a receiving section that receives information regarding a plurality of reference signals associated with one or more Transmission Configuration Indicator (TCI) states; and a control section that controls reception of a downlink physical channel assuming quasi-co-location with at least one of the plurality of reference signals.

5 Claims, 16 Drawing Sheets

(56) References Cited

OTHER PUBLICATIONS

Qualcomm Incorporated; "Maintenance on Reference Signals and QCL"; 3GPP TSG RAN WG1 Meeting #94bis, R1-1811232; Chengdu, China; Oct. 8-12, 2018 (16 pages).
Ericsson; "Remaining details on QCL"; 3GPP TSG-RAN WG1 NR Ad Hoc #3, R1-1716376; Nagoya, Japan; Sep. 18-21, 2017 (5 pages).
3GPP TS 36.300 V8.12.0; "3rd Generation Partnership Project; Technical Specification Group Radio Access Network Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

* cited by examiner

| TCI STATE | |
|---|---|
| DL RS | qcl-Type |
| QRS#1 | QCL-Type D |

FIG. 7

USER TERMINAL AND RADIO COMMUNICATION METHOD

TECHNICAL FIELD

The present disclosure relates to a user terminal and a radio communication method in a next-generation mobile communication system.

BACKGROUND ART

In the universal mobile telecommunications system (UMTS) network, long term evolution (LTE) has been specified for the purpose of further increasing a data rate, providing low latency, and the like (see Non Patent Literature 1). Furthermore, LTE-Advanced (third generation partnership project (3GPP) Release (Rel.) 10-14) has been specified for the purpose of further increasing capacity and sophistication of LTE (3GPP Rel. 8 and 9).

LTE's successor systems (for example, also referred to as 5th generation mobile communication system (5G), 5G plus (+), New Radio (NR), or 3GPP Rel. 15 or later) have also been studied.

CITATION LIST

Non Patent Literature

Non Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

In a future radio communication system (hereinafter, also simply referred to as NR), it has been studied to determine a Quasi-Co-Location (QCL) relation of a channel or a signal on the basis of a Transmission Configuration Indicator (TCI) state to control transmission/reception processing.

However, a TCI state control method studied so far for Rel-15 NR requires a relatively long time to change the TCI state and requires communication overhead. Thus, for example, in a case where the TCI state needs to be changed frequently, communication throughput may be reduced.

Thus, an object of the present disclosure is to provide a user terminal and a radio communication method capable of switching a TCI state, a QCL assumption, or a beam of a channel at high speed.

Solution to Problem

A user terminal according to one aspect of the present disclosure includes: a receiving section that receives information regarding a plurality of reference signals associated with one or more Transmission Configuration Indicator (TCI) states; and a control section that controls reception of a downlink physical channel assuming quasi-co-location with at least one of the plurality of reference signals.

Advantageous Effects of Invention

According to an aspect of the present disclosure, a TCI state, a QCL assumption, or a beam of a channel can be switched at high speed.

BRIEF DESCRIPTION OF DRAWINGS

FIG. 7 is a diagram illustrating another example of the reference signal configured as the TCI state.

DESCRIPTION OF EMBODIMENTS (Coreset)

Figure 1:
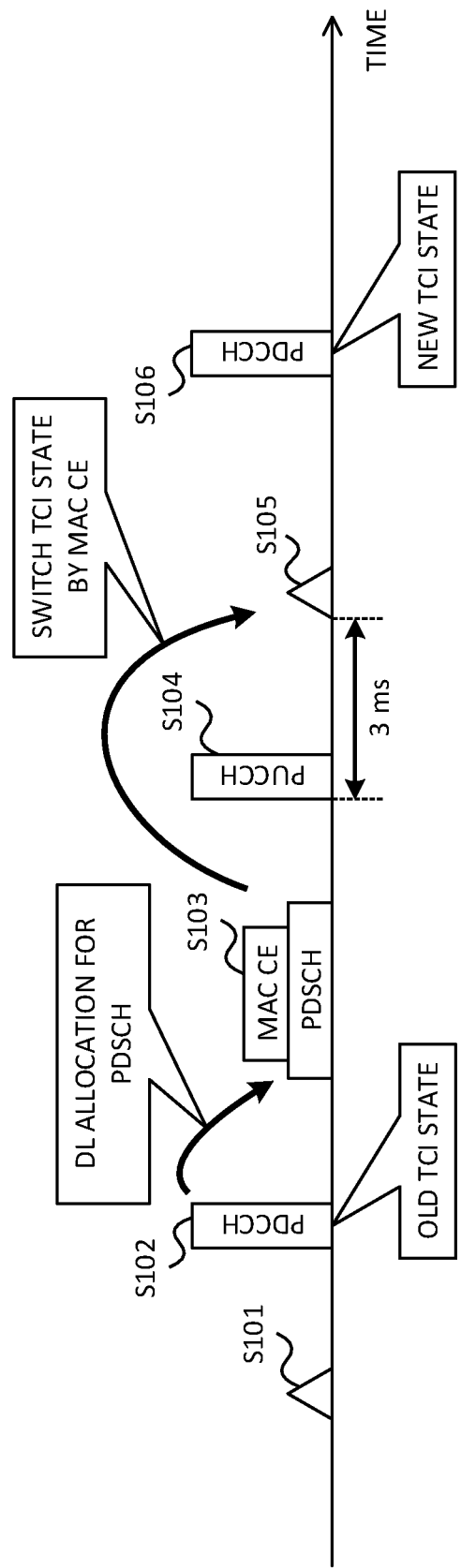
FIG. 1 is a diagram illustrating an example of beam management for a PDCCH in Rel-15 NR.

In NR, to transmit a physical layer control signal (for example, downlink control information (DCI)) from a base station to a user terminal (User Equipment (UE)), a control resource set (CORESET) is used.

The CORESET is an allocation candidate area of a control channel (for example, a physical downlink control channel (PDCCH)). The CORESET may include a given frequency domain resource and time domain resource (for example, one or two OFDM symbols).

The UE may receive CORESET configuration information (which may be referred to as CORESET configuration or coreset-Config) from the base station. The UE can detect a physical layer control signal by monitoring CORESET configured in the UE itself.

Notification of the CORESET configuration may be performed by, for example, higher layer signaling, and the CORESET configuration may be represented by a given RRC information element (which may be referred to as "ControlResourceSet").

Here, higher layer signaling may be, for example, any of Radio Resource Control (RRC) signaling, Medium Access Control (MAC) signaling, broadcast information, and the like, or a combination thereof.

For the MAC signaling, for example, a MAC Control Element (MAC CE), a MAC Protocol Data Unit (PDU), or the like may be used. The broadcast information may be, for example, a Master Information Block (MIB), a System Information Block (SIB), Remaining Minimum System Information (RMSI), or the like.

A given number (for example, three or less) of CORESETs may be configured for each bandwidth part (BWP) configured in the UE in a serving cell.

A search area and a search method for PDCCH candidates are defined as a Search Space (SS). The UE may receive search space configuration information (which may be referred to as search space configuration) from the base station. Notification of search space configuration may be performed by, for example, higher layer signaling (RRC signaling or the like).

The UE monitors the CORESET on the basis of the search space configuration. The UE can determine a correspondence between the CORESET and the search space on the basis of a CORESET-ID included in the search space configuration. One CORESET may be associated with one or a plurality of search spaces.

(QCL/TCI)

In NR, it has been studied to control reception processing (for example, at least one of reception, demapping, demodulation, or decoding) of at least one of a signal and a channel (expressed as a signal/channel) on the basis of a Transmission Configuration Indication State (TCI state).

Here, the TCI state is information regarding quasi-co-location (QCL) of a channel or a signal, and may also be referred to as a spatial Rx parameter, spatial relation info, or the like. The TCI state may be configured in the UE for each channel or each signal. The UE may determine at least one of a transmission beam (Tx beam) or a reception beam (Rx beam) of a channel on the basis of the TCI state of the channel.

The QCL is an indicator indicating a statistical property of a channel/signal. For example, when one signal/channel and another signal/channel have a QCL relation, this may mean that it is possible to assume that the plurality of different signals/channels have at least one identical property out of Doppler shift, Doppler spread, average delay, delay spread, or spatial parameter (for example, spatial Rx parameter) (a QCL relation is established regarding at least one of these).

Note that, the spatial Rx parameter may correspond to a reception beam of the UE (for example, a reception analog beam), and the beam may be specified on the basis of spatial QCL. The QCL (or at least one element of the QCL) in the present disclosure may be replaced with the spatial QCL (sQCL).

A plurality of types of QCL (QCL types) may be specified. For example, four QCL types A to D with different parameters (or parameter sets) that can be assumed to be identical may be provided. These parameters are as follows:

QCL type A: Doppler shift, doppler spread, average delay, and delay spread;
QCL Type B: Doppler shift and doppler spread;
QCL type C: Doppler shift and average delay; and
QCL type D: spatial Rx parameter.

The TCI state may be, for example, information regarding QCL of a target channel (or a Reference Signal (RS) for the channel) and another signal (for example, another Downlink Reference Signal (DL-RS). The TCI state may be configured (indicated) by higher layer signaling, physical layer signaling, or a combination thereof.

In the present disclosure, higher layer signaling may be, for example, any of Radio Resource Control (RRC) signaling, Medium Access Control (MAC) signaling, broadcast information, and the like, or a combination thereof.

For the MAC signaling, for example, a MAC Control Element (MAC CE), a MAC Protocol Data Unit (PDU), or the like may be used. The broadcast information may be, for example, a Master Information Block (MIB), a System Information Block (SIB), Remaining Minimum System Information (RMSI), Other System Information (OSI), or the like.

The physical layer signaling may be, for example, Downlink Control Information (DCI).

A channel for which a TCI state is configured (specified) may be, for example, at least one of a Physical Downlink Shared Channel (PDSCH), a Physical Downlink Control Channel (PDCCH), a Physical Uplink Shared Channel (PUSCH), or a Physical Uplink Control Channel (PUCCH).

Furthermore, an RS (DL-RS) that has a QCL relation with the channel may be, for example, at least one of a Synchronization Signal Block (SSB), a Channel State Information Reference Signal (CSI-RS), and a Sounding Reference Signal (SRS). Alternatively, the DL-RS may be a CSI-RS (also referred to as a TRS) used for tracking, or a reference signal (also referred to as a QRS) used for QCL detection.

The SSB is a signal block including at least one of a Primary Synchronization Signal (PSS), a Secondary Synchronization Signal (SSS), or a Physical Broadcast Channel (PBCH). The SSB may be referred to as an SS/PBCH block.

An information element in a TCI state configured by higher layer signaling ("TCI-state IE" of RRC) may include one or a plurality of pieces of QCL information ("QCL-Info"). The QCL-Info may include at least one of information regarding the DL-RS having a QCL relation (DL-RS related information) or information indicating a QCL type (QCL type information). The DL-RS related information may include information such as an index of the DL-RS (for example, an SSB index or a non zero power CSI-RS resource ID), an index of a cell where the RS is located, or an index of a Bandwidth Part (BWP) where the RS is located.

Information regarding QCL of a PDCCH (or a DMRS antenna port associated with the PDCCH) and a given DL-RS may be referred to as a TCI state for a PDCCH.

The UE may determine a TCI state for a UE-specific PDCCH (CORESET) on the basis of RRC signaling and the MAC CE.

For example, for the UE, one or a plurality of (K) TCI states may be configured by higher layer signaling (ControlResourceSet information element) for each CORESET. Furthermore, the UE may activate one TCI state for each CORESET by using the MAC CE. The MAC CE may be referred to as a TCI state indication for UE-specific PDCCH MAC CE. The UE may monitor the CORESET on the basis of an active TCI state (for example, one TCI state) corresponding to the CORESET.

The TCI state may correspond to the beam. For example, the UE may assume that PDCCHs with different TCI states are transmitted using different beams.

Information regarding QCL of a PDSCH (or a DMRS antenna port associated with the PDSCH) and a given DL-RS may be referred to as a TCI state for the PDSCH.

The UE may be notified (configured) of M (M≥1) TCI states for PDSCHs (QCL-Info for M PDSCHs) by higher layer signaling. Note that, the number M of TCI states configured in the UE may be limited by at least one of UE capability or the QCL type.

DCI used for PDSCH scheduling may include a given field (which may be referred to as, for example, a field for TCI, a TCI field, a TCI state field, or the like) indicating a TCI state (QCL-Info for the PDSCH). The DCI may be used for PDSCH scheduling of one cell, and may be referred to as, for example, DL DCI, DL assignment, DCI format 1_0, or DCI format 1_1.

Furthermore, when the DCI includes an x-bit (for example, x=3) TCI field, the base station may preliminarily configure, in the UE, up to $2^x$ (for example, eight when x=3) types of TCI states using higher layer signaling. A value of the TCI field in the DCI (TCI field value) may indicate one of the TCI states preliminarily configured by higher layer signaling.

When more than eight types of TCI states are configured in the UE, the MAC CE may be used to activate (or specify) eight or less TCI states. The MAC CE may be referred to as a TCI States Activation/Deactivation for UE-specific PDSCH MAC CE. A value of the TCI field in the DCI may indicate one of the TCI states activated by the MAC CE.

The UE may determine QCL of a PDSCH (or a DMRS port of the PDSCH) on the basis of a TCI state indicated by a TCI field value in the DCI. For example, by assuming that the DMRS port (or DMRS port group) of the PDSCH of a serving cell has a QCL relation with the DL-RS corresponding to the TCI state whose notification has been performed by the DCI, the UE may control PDSCH reception processing (for example, decoding, demodulation, or the like).

(Beam Management)

By the way, in Rel-15 NR, a beam management (BM) method has been studied so far. In the beam management, it has been studied to perform beam selection on the basis of L1-RSRP reported by the UE. Changing (switching) a beam of a signal/channel is equivalent to changing a TCI state (QCL) of the signal/channel.

Note that, the beam selected by the beam selection may be a transmission beam (Tx beam) or a reception beam (Rx beam). Furthermore, the beam selected by the beam selection may be a beam of the UE or a beam of the base station.

The UE may include the L1-RSRP in CSI and report the L1-RSRP using a Physical Uplink Control Channel (PUCCH) or a Physical Uplink Shared Channel (PUSCH).

Note that, the CSI may include at least one of a Channel Quality Indicator (CQI), a Precoding Matrix Indicator (PMI), a CSI-RS Resource Indicator (CRI), an SS/PBCH Block Resource Indicator (SSBRI), a Layer Indicator (LI), a Rank Indicator (RI), L1-RSRP, or the like.

A measurement result (for example, CSI) reported for beam management may be referred to as a beam measurement, a beam measurement result, a beam measurement report, a beam report, or the like.

The UE may measure a channel state using a resource for CSI measurement to derive the L1-RSRP. The resource for CSI measurement may be, for example, at least one of an SS/PBCH block resource, a CSI-RS resource, another reference signal resource, or the like. Configuration information of a CSI measurement report may be configured in the UE using higher layer signaling.

The configuration information of the CSI measurement report (CSI-MeasConfig or CSI-ResourceConfig) may include information such as one or more Non Zero Power (NZP) CSI-RS resource sets (NZP-CSI-RS-ResourceSet) for CSI measurement, one or more zero power (ZP) CSI-RS resource sets (ZP-CSI-RS-ResourceSet) (or CSI-Interference Management (IM) resource sets (CSI-IM-ResourceSet)), and one or more SS/PBCH block resource sets (CSI-SSB-ResourceSet).

The information of each resource set may include information regarding repetition in a resource in the resource set. The information regarding the repetition may indicate, for example, 'on' or 'off'. Note that, 'on' may be expressed as 'enabled' or 'valid', and 'off' may be expressed as 'disabled' or 'invalid'.

For example, for a resource set for which repetition is configured to be 'on', the UE may assume that a resource in the resource set has been transmitted using the same downlink spatial domain transmission filter. In this case, the UE may assume that the resource in the resource set has been transmitted using the same beam (for example, from the same base station using the same beam).

For a resource set for which repetition is configured to be 'off', the UE may perform control such that the UE should not assume (or does not have to assume) that a resource in the resource set has been transmitted using the same downlink spatial domain transmission filter. In this case, the UE may assume that the resource in the resource set is not transmitted using the same beam (transmitted using a different beam). That is, the UE may assume that the base station performs beam sweeping for the resource set for which repetition is configured to be 'off'.

FIG. 1 is a diagram illustrating an example of beam management for a PDCCH in Rel-15 NR. A network (NW) (for example, a base station) determines to switch a TCI state for a PDCCH of a UE (step S101). The NW transmits DCI for PDSCH scheduling to the UE using a PDCCH according to an old (pre-switching) TCI state (step S102).

Furthermore, the base station transmits the PDSCH including the TCI state indication for UE-specific PDCCH MAC CE (step S103).

When detecting the DCI, the UE decodes the PDSCH and acquires the MAC CE. When receiving the MAC CE, the UE transmits hybrid automatic repeat request acknowledgement (HARQ-ACK) for the PDSCH that has provided the MAC CE (step S104). The UE applies an activation command for a TCI state based on the MAC CE after three milliseconds from a slot for transmitting the HARQ-ACK (step S105).

Thereafter, the base station transmits a PDCCH according to a new (post-switching) TCI state, and the UE can receive and decode the PDCCH (step S106).

As described above, the TCI state control method for the PDCCH studied so far for Rel-15 NR requires a relatively long time to change the TCI state. Furthermore, also for another channel (PDSCH, PUCCH, or the like), it takes a relatively long time to change the TCI state, and communication overhead is required. Thus, for example, in a case where the TCI state needs to be changed frequently, delay required for the change is a problem, and communication throughput may be reduced.

Thus, the present inventors have conceived of a method for switching a TCI state, a QCL assumption, or a beam of a channel at high speed.

Hereinafter, embodiments according to the present disclosure will be described in detail with reference to the drawings. Configurations described in respective aspects may be applied individually or in combination.

(First Aspect)

In a first aspect, a plurality of TCI states is assumed, and reception of at least one of a PDCCH or a PDSCH (hereinafter, also referred to as PDCCH/PDSCH) is controlled. Note that, the plurality of TCI states may be replaced with a plurality of reference signals respectively corresponding to different TCI states, or a plurality of reference signals respectively corresponding to different QCLs.

The network (or the base station) configures the plurality of TCI states (or QCL assumptions) in the UE for a demodulation reference signal (DMRS) of the PDCCH/PDSCH. For example, the base station may configure reference signals corresponding to respective TCI states in the UE (see FIG. 2). The base station may configure the plurality of TCI states (or reference signals) in the UE by at least one (or any combination) of higher layer signaling, MAC control information, or DCI.

Figure 2:
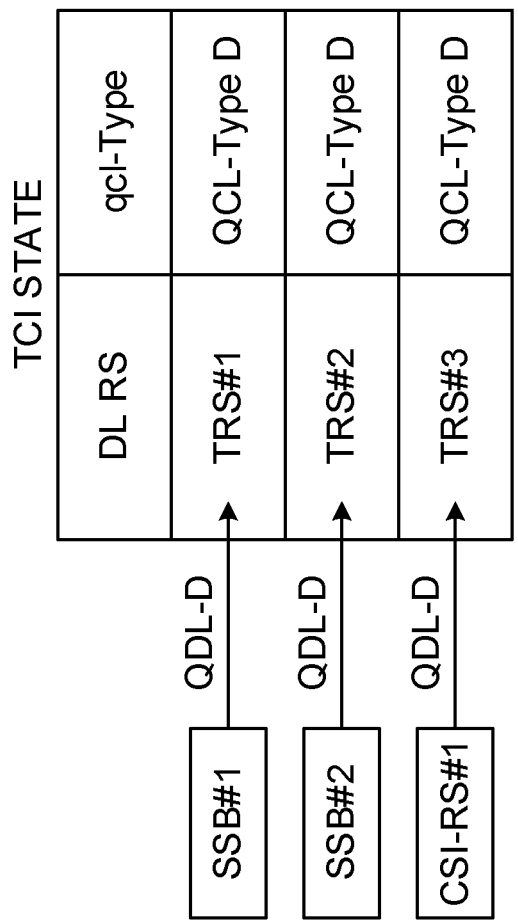
FIG. 2 is a diagram illustrating an example of a reference signal configured as a TCI state.

Furthermore, the base station may configure the plurality of TCI states (or reference signals) for each given unit (for example, for each CORESET). FIG. 2 illustrates a case where three TCI states (or reference signals) are configured. For example, the base station may configure a given number (for example, 64) of TCI states by higher layer signaling, and specify three TCI states by MAC control information. Of course, the number of TCI states (or reference signals) that can be configured is not limited to this.

Here, a case is illustrated where TRSs (TRSs #1-#3) corresponding to CSI-RSs for tracking are configured as the reference signals corresponding to the respective TCI states, but the reference signals to be configured are not limited to the case. Instead of the TRS, a CSI-RS for another purpose (for example, a CSI-RS for the L1-RSRP, or a CSI-RS for mobility) may be configured. Alternatively, a reference signal other than the CSI-RS (for example, the QRS corresponding to the reference signal for QCL detection) may be configured instead of the TRS.

Furthermore, the reference signals (TRSs #1-#3) may be associated with other reference signals respectively having QCL relations with the TRS #1-#3. In FIG. 2, a case is illustrated where the TRS #1 and an SSB #1 have a QCL type D relation, the TRS #2 and an SSB #2 have a QCL type D relation, and the TRS #3 and a CSI-RS #1 have a QCL type D relation. Information regarding the QCL relation between the TRSs and other reference signals may be configured from the base station to the UE by using higher layer signaling or the like.

The UE detects the PDCCH/PDSCH in consideration of the plurality of TCI states (or the TRSs #1-#3 corresponding to the TCI states) configured from the base station. For example, the UE performs reception processing assuming that at least one of the TRSs #1-#3, and the DMRS of the PDCCH/PDSCH have a QCL relation.

In this case, the UE may control the reception of the TRSs #1-#3 simultaneously by using a plurality of beams (for example, a plurality of analog beams) on the basis of the capability of the UE itself. Furthermore, the UE may consider another reference signal (for example, at least one of the SSB #1, SSB #2, or CSI-RS #1) that has a QCL relation with each TRS in reception of the TRSs #1-#3.

Furthermore, the UE may notify the base station in advance of information regarding the number of TCI states supported by the UE itself (for example, the number of TCI states that can be received simultaneously) as UE capability information.

As described above, the plurality of TCI states (or reference signals) is configured and the PDCCH/PDSCH is received assuming the plurality of TCI states, whereby the TCI state can be switched at high speed even when the TCI state is changed. For example, even when transmission of the PDCCH/PDSCH is performed by switching the TCI state from a first TCI state (TRS #1) to a second TCI state (TRS #2), reception is performed assuming the plurality of TCI states in advance, whereby the switching operation illustrated in FIG. 1 can be eliminated. As a result, it becomes possible to switch the TCI state, QCL assumption, or beam of the channel at high speed.

Furthermore, the UE may assume that the same TCI state is applied to the PDCCH and the PDSCH scheduled by the PDCCH at least in CORESET units. For example, the UE receives the PDSCH assuming that it is in the same TCI state as the PDCCH, for the PDSCH scheduled by the PDCCH. As a result, it is not necessary to switch the TCI state in reception of the PDCCH and PDSCH, so that UE operation can be simplified.

(Second Aspect)

In a second aspect, one or more reference signals that are sources are configured for the reference signal configured as the TCI state, and the reception of the PDCCH/PDSCH is controlled by using the reference signals that are sources. The reference signals that are sources may be reference signal candidates (QCL candidate reference signals) that have QCL relations with the reference signal of the TCI state.

Figure 3:
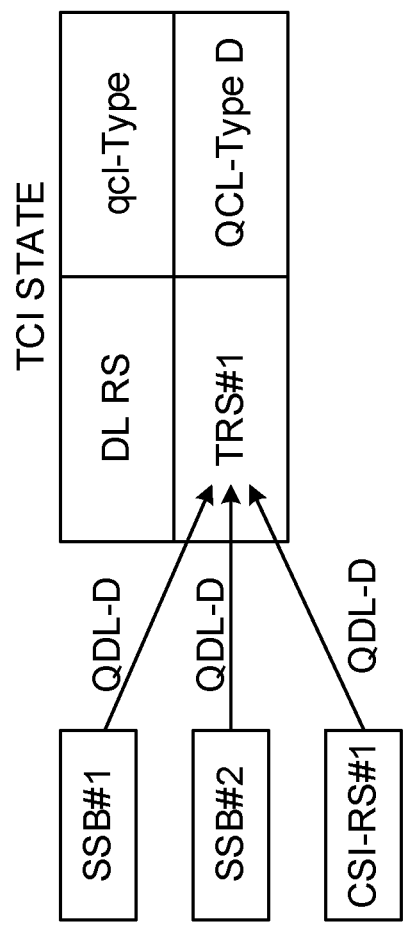
FIG. 3 is a diagram illustrating another example of the reference signal configured as the TCI state.

The network (or the base station) configures a given TCI state (or QCL assumption) associated with a given reference signal in the UE for the demodulation reference signal (DMRS) of the PDCCH/PDSCH (see FIG. 3). The base station may configure the given TCI state (or reference signal) in the UE by at least one (or any combination) of higher layer signaling, MAC control information, or DCI.

Furthermore, the base station may configure a reference signal corresponding to the given TCI state for each given unit (for example, for each CORESET). FIG. 3 illustrates a case where one reference signal (here, TRS #1) is configured in the UE. For example, the base station may configure a given number (for example, 64) of TCI states by higher layer signaling, and specify one TCI state by MAC control information. Of course, the number of reference signals is not limited to this.

Here, a case is illustrated where a TRS (TRS #1) corresponding to a CSI-RS for tracking is configured as the reference signal corresponding to each TCI state, but the reference signal to be configured is not limited to this. Instead of the TRS, a CSI-RS for another purpose (for example, a CSI-RS for the L1-RSRP, or a CSI-RS for mobility) may be configured.

Figure 4:
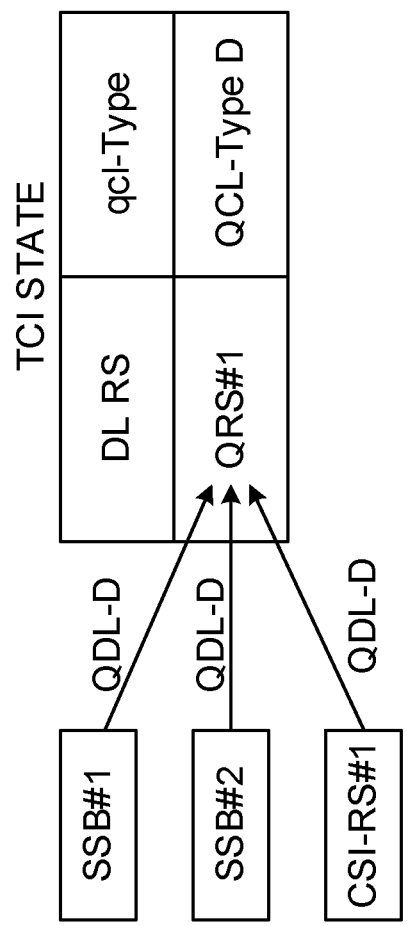
FIG. 4 is a diagram illustrating another example of the reference signal configured as the TCI state.

Alternatively, a reference signal other than the CSI-RS (for example, the QRS corresponding to the reference signal for QCL detection) may be configured instead of the TRS (see FIG. 4). FIG. 4 illustrates a case where QRS #1 is configured in the UE. In the following description, the TRS may be replaced with the QRS and applied.

Furthermore, the configured reference signal (TRS #1) may be associated with a reference signal candidate (QCL candidate reference signal) that has a QCL relation with the TRS #1. The reference signal candidate may be referred to as a source reference signal.

FIG. 3 illustrates a case where at least one of the SSB #1, SSB #2, or CSI-RS #1 is configured as a reference signal that is a source of the TRS #1 of the TCI state. The number and types of reference signals that are sources are not limited to those. Information regarding the source reference signal associated with the TRS #1 may be configured in the UE from the base station by using higher layer signaling or the like.

The UE may assume that at least one reference signal and the TRS #1 have a QCL relation when a plurality of reference signals is configured that is sources of the TRS #1. For example, when the plurality of reference signals is configured that can be the sources of the TRS #1, the UE determines a reference signal that has a QCL relation with the TRS #1.

As an example, the UE may specify a source reference signal that has a QCL relation on the basis of the received power of the TRS #1, the sequence of the TRS #1, and the like. When performing determination on the basis of the received power of the TRS #1, the UE may generate a transmission replica of the SSB or CSI-RS, and specify an appropriate reference signal by comparing the received TRS #1 with the generated transmit replica. Note that, maximum likelihood detection (MLD) or the like may be used to compare the received TRS #1 with the generated transmission replica.

The UE may perform reception processing assuming that the TRS #1 (or the specified reference signal) and the DMRS of the PDCCH/PDSCH have a QCL relation.

In this case, the UE may notify the base station in advance of information regarding the number of reference signals that are sources that can be supported by the UE itself (for example, the number of reference signals that can be calculated when a reference signal having a QCL relation with the TRS #1 is specified) as UE capability information.

Figure 5:
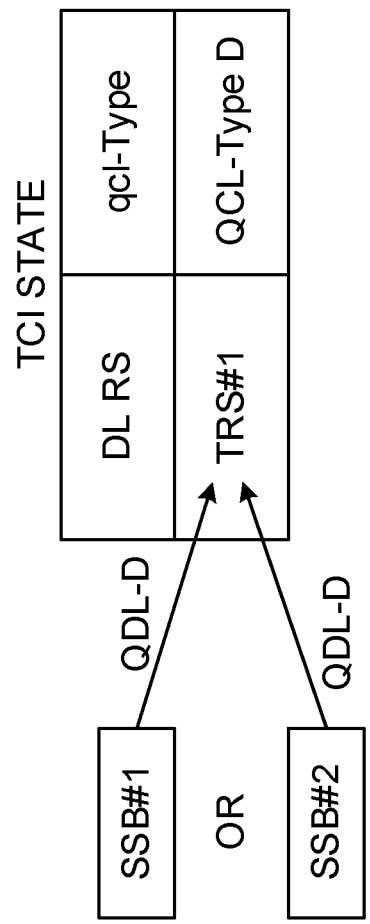
FIG. 5 is a diagram illustrating another example of the reference signal configured as the TCI state.

When the plurality of reference signals is configured as sources of the TRS, the base station may be configured not to give explicit notification to the UE when changing or updating the TCI state (QCL) in the beam selection of the PDCCH. For example, a case is assumed where the SSB #1 or SSB #2 is configured as the source for the TRS #1 configured as the TCI state (see FIG. 5). Note that, here, the SSB #1 and SSB #2 are taken as examples, but the reference signal of the source that can be configured is not limited to those. For example, the CSI-RS may be configured as the reference signal of the source, or another downlink reference signal (for example, the DMRS of the PDCCH/PDSCH) may be configured as the reference signal of the source.

In this case, the UE determines that either the SSB #1 or SSB #2 has a QCL relation with the TRS #1. The base station does not have to notify the UE which source (SSB #1 or SSB #2) has a QCL relation with the TRS #1. The UE determines that either the SSB #1 or SSB #2 has a QCL relation with the TRS #1, and receives the PDCCH even if there is no explicit notification from the base station regarding the QCL relation (see FIG. 6).

Figure 6:
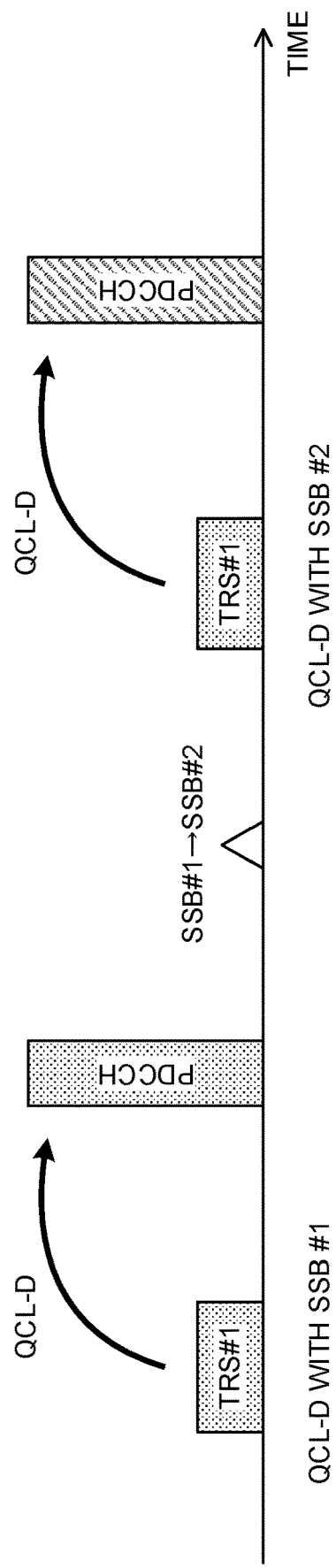
FIG. 6 is a diagram illustrating an example of a TCI state (QCL assumption) changing operation.

FIG. 6 illustrates an example of an update of QCL of the PDCCH. Here, a case is illustrated where QCL of the TRS #1 is changed from the SSB #1 to the SSB #2. First, the base station transmits the PDCCH that has a QCL relation with the TRS #1. At this point, the TRS #1 has a QCL relation with the SSB #1. The UE determines whether or not either the SSB #1 or SSB #2 has a QCL relation on the basis of the reception result of the TRS #1 (here, selects the SSB #1), and controls the reception of the PDCCH.

Thereafter, the base station changes the QCL of the TRS #1 from the SSB #1 to the SSB #2. At this time, the base station does not give explicit notification to the UE regarding the QCL change. After performing the change of the QCL, the base station transmits the PDCCH that has a QCL relation with the TRS #1. At this point, the TRS #1 has a QCL relation with the SSB #2. The UE determines whether or not either the SSB #1 or SSB #2 has a QCL relation on the basis of the reception result of the TRS #1 (here, selects the SSB #2), and controls the reception of the PDCCH.

In this case, since explicit notification is not necessary from the base station to the UE regarding the QCL, the delay in beam selection of the PDCCH can be reduced.

As described above, the plurality of reference signals that is sources is configured for the reference signal (for example, the TRS or QRS) configured as the TCI state, and the PDCCH/PDSCH is received in consideration of the QCL with at least one of the plurality of reference signals, whereby the TCI state can be switched at high speed even when the TCI state is changed. For example, even when transmission of the PDCCH/PDSCH is performed by switching the TCI state from the first TCI state (a QCL assumption corresponding to the SSB #1) to the second TCI state (a QCL assumption corresponding to the SSB #2), reception is performed assuming the plurality of TCI states in advance, whereby the switching operation illustrated in FIG. 1 can be eliminated. As a result, it becomes possible to switch the TCI state, QCL assumption, or beam of the channel at high speed.

Furthermore, the UE may assume that the same TCI state is applied to the PDCCH and the PDSCH scheduled by the PDCCH at least in CORESET units. For example, the UE receives the PDSCH assuming that it is in the same TCI state as the PDCCH, for the PDSCH scheduled by the PDCCH. As a result, it is not necessary to switch the TCI state in reception of the PDCCH and PDSCH, so that UE operation can be simplified.

(Third Aspect)

In a third aspect, an appropriate reception spatial domain filter is determined for the reference signal configured as the TCI state, and the reception of the PDCCH/PDSCH is controlled by using the reception spatial domain filter. Note that, the reception spatial domain filter (Rx spatial domain filter) may be referred to as a spatial domain filter or a reception beam.

Figure 7:
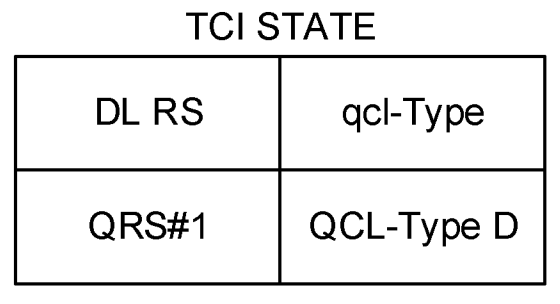

The network (or the base station) configures a given TCI state (or QCL assumption) associated with a given reference signal in the UE for the demodulation reference signal (DMRS) of the PDCCH/PDSCH (see FIG. 7). The base station may configure the given TCI state (or reference signal) in the UE by at least one (or any combination) of higher layer signaling, MAC control information, or DCI.

Furthermore, the base station may configure a reference signal corresponding to the given TCI state for each given unit (for example, for each CORESET). FIG. 7 illustrates a case where one reference signal (here, the QRS #1) is configured in the UE. For example, the base station may configure a given number (for example, 64) of TCI states by higher layer signaling, and specify one TCI state by MAC control information. Of course, the number of reference signals is not limited to this. Furthermore, the base station may configure information regarding the QRS (for example, at least one of the time resource, frequency resource, period, or transmission type in which the QRS is configured) in the UE by higher layer signaling or the like.

Here, a case is illustrated where the QRS used for QCL detection is configured as the reference signal corresponding to each TCI state, but the reference signal to be configured is not limited to this. Instead of the QRS, the TRS may be configured, or a CSI-RS for another purpose (for example, the CSI-RS for the L1-RSRP or the CSI-RS for mobility) may be configured. Note that, the QRS may be referred to as a QCL RS or an RS for QCL.

Furthermore, a configuration may be made in which the reference signal candidate that has a QCL relation with the QRS #1 (QCL candidate reference signal) is not particularly associated with the configured reference signal (QRS #1). In this case, the QRS itself corresponds to the source of the reference signal of the TCI state.

When the QRS is configured as the TCI state, the UE may determine a reception spatial domain filter suitable for reception of the QRS. For example, the UE may determine a given reception spatial domain filter by receiving a QRS repeatedly transmitted in a given time domain using different reception spatial domain filters. The given reception spatial domain filter may be the one by which the received power of the received QRS is the highest.

The base station may repeatedly transmit a QRS to which the same transmission spatial domain filter is applied, with different OFDM symbols (for example, N consecutive OFDM symbols in the time direction) (repetition on). The transmission spatial domain filter (Tx spatial domain filter) may be referred to as a spatial domain filter, a DL spatial domain filter, or a transmission beam. The UE only needs to perform a beam sweep to determine the given reception spatial domain filter assuming that the QRS to which the same transmission spatial domain filter is applied is transmitted with different symbols.

Specifically, a reception spatial domain filter different for each symbol is applied to receive the QRS, and a reception spatial domain filter is selected by which the received power is the highest.

Furthermore, the UE may notify the base station in advance of information regarding the number of symbols required for determination of the reception spatial domain filter (for example, the number of reception spatial domain filters supported by the UE) as UE capability information.

When the QRS is configured, the UE may perform reception processing assuming that the QRS and the PDCCH/PDSCH allocated to the time domain after the QRS allocated time domain (for example, the later symbol) have a QCL relation.

Figure 8:
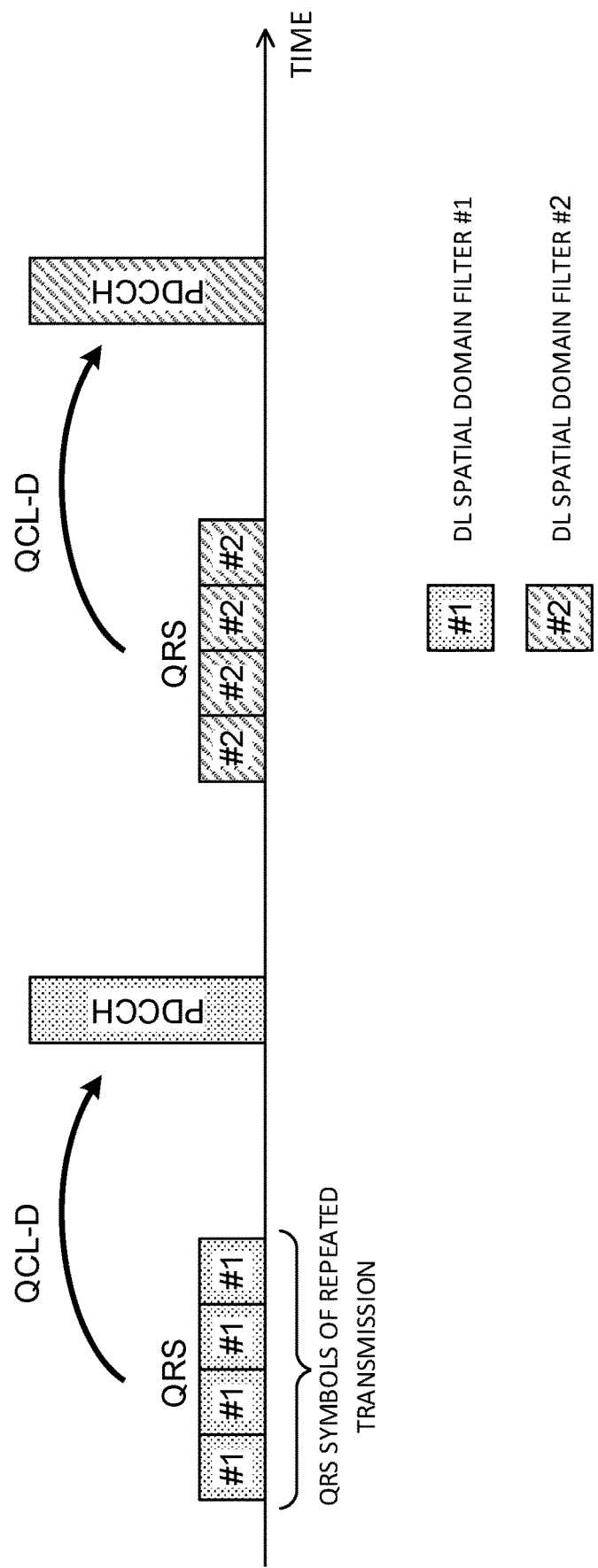
FIG. 8 is a diagram illustrating another example of the TCI state (QCL assumption) changing operation.

FIG. 8 is a diagram illustrating an example in a case where the PDCCH is received on the basis of the QRS. When the QRS is configured from the base station, the UE performs reception processing in a QRS resource and determines a given spatial domain filter to be used for reception. The UE may be notified of information regarding the QRS resource from the base station in advance.

Here, the QRS to which the same transmission spatial domain filter #1 is applied is repeatedly transmitted four times (for example, with four different symbols), and the UE receives the QRS by using different reception spatial domain filters to determine the given reception spatial domain filter. The UE assumes that the PDCCH and QRS transmitted thereafter have a QCL relation, and applies the given reception spatial domain filter to receive the PDCCH (PDCCH to which the transmission spatial domain filter #1 is applied).

When transmitting the PDCCH by switching the reception beam, the base station transmits the QRS by switching the transmission spatial domain filter in the QRS resource. Here, a case is illustrated where the QRS is transmitted by using a transmission spatial domain filter #2. The UE receives the QRS repeatedly transmitted in the configured QRS resource. Furthermore, the UE can specify the given reception spatial domain filter appropriate for the reception by performing reception by switching the reception spatial domain filter used for the reception. The UE assumes that the PDCCH and QRS transmitted thereafter have a QCL relation, and applies the given reception spatial domain filter to receive the PDCCH (PDCCH to which the transmission spatial domain filter #2 is applied).

FIG. 8 illustrates a case where QRS resources are configured in common regardless of the number of transmission spatial domain filters applied to QRS transmission. That is, the UE receives the QRS to which one of the transmission spatial domain filters is applied in the QRS resource configured from the base station.

As described above, the given reception spatial domain filter selected on the basis of the reference signal (for example, QRS) configured as the TCI state is applied and the PDCCH/PDSCH is received, whereby, even when the transmission beam (transmission spatial domain filter) is changed, the corresponding reception beam (reception spatial domain filter) can be switched at high speed.

Furthermore, the UE may assume that the same TCI state is applied to the PDCCH and the PDSCH scheduled by the PDCCH at least in CORESET units. For example, the UE receives the PDSCH assuming that it is in the same TCI state as the PDCCH, for the PDSCH scheduled by the PDCCH. As a result, it is not necessary to switch the TCI state in reception of the PDCCH and PDSCH, so that UE operation can be simplified.

<Plurality of QRS Resource Configurations>

FIG. 8 illustrates the case where the QRS resources are configured in common regardless of the number of transmission spatial domain filters applied to QRS transmission, but this is not a limitation. For example, different QRS resources may be configured depending on the transmission spatial domain filter applied to the QRS transmission (see FIG. 9).

Figure 9:
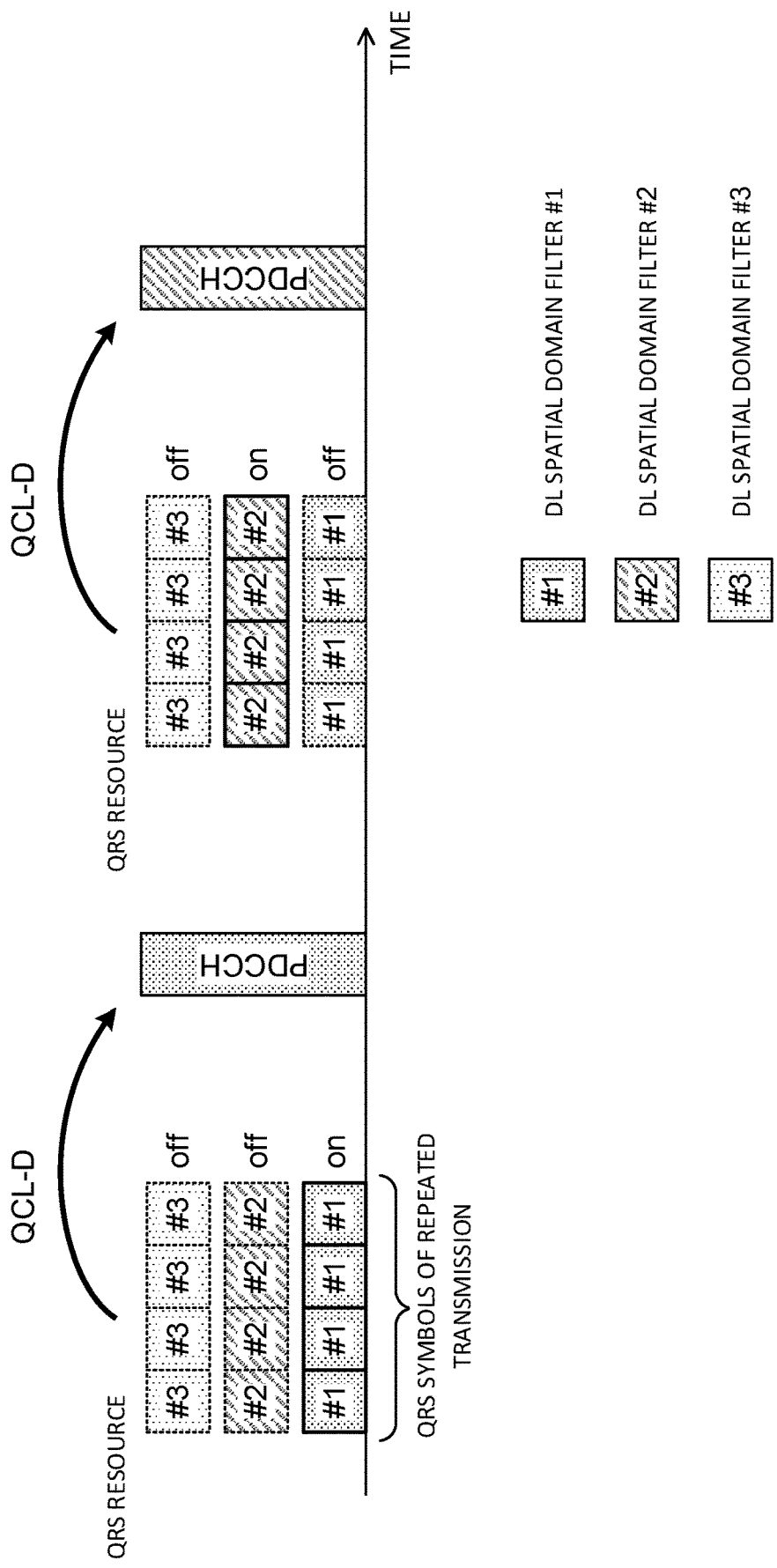
FIG. 9 is a diagram illustrating another example of the TCI state (QCL assumption) changing operation.

FIG. 9 illustrates a case where QRS resources #1-#3 respectively corresponding to transmission spatial domain fields #1-#3 that can be applied to the QRS are configured. The QRS resources #1-#3 may be resources divided by at least one of time multiplexing, frequency multiplexing, sequence multiplexing, or cyclic shift multiplexing. The UE may be notified of information regarding the QRS resources #1-#3 from the base station.

FIG. 9 illustrates a case where the QRS resources #1-#3 are configured in the same time domain (for example, a case where at least one of frequency multiplexing, sequence multiplexing, or cyclic shift multiplexing is applied), but the QRS resources may be configured in different time domains by time multiplexing.

In FIG. 9, the QRS to which the transmission spatial domain filter #1 is applied is repeatedly transmitted four times (for example, with four different symbols) in the QRS resource #1. On the other hand, the QRS is not transmitted in the QRS resources #2 and #3. That is, the base station applies (turns on) the transmission spatial domain filter #1 and does not apply (turns off) the transmission spatial domain filters #2 and #3.

In the QRS resources #1-#3, the UE attempts to receive the QRS by using different reception spatial domain filters and determines the given reception spatial domain filter. Here, the UE receives the QRS in the QRS resource #1, so that the UE can determine that the base station applies the transmission spatial domain filter #1. The UE assumes that the PDCCH and QRS transmitted thereafter have a QCL relation, and applies the given reception spatial domain filter to receive the PDCCH (PDCCH to which the transmission spatial domain filter #1 is applied).

When transmitting the PDCCH by switching the reception beam (for example, by applying the transmission spatial domain filter #2), the base station transmits the QRS to which the transmission spatial domain filter #2 is applied in the QRS resource #2. When receiving the QRS in the QRS resource #2, the UE can determine that the base station applies the transmission spatial domain filter #2. The UE assumes that the PDCCH and QRS transmitted thereafter have a QCL relation, and applies the given reception spatial domain filter to receive the PDCCH (PDCCH to which the transmission spatial domain filter #2 is applied).

As described above, by configuring the QRS resource separately for each transmission spatial domain filter applied to the QRS, the UE can determine the transmission spatial domain filter applied by the base station.

Figure 10:
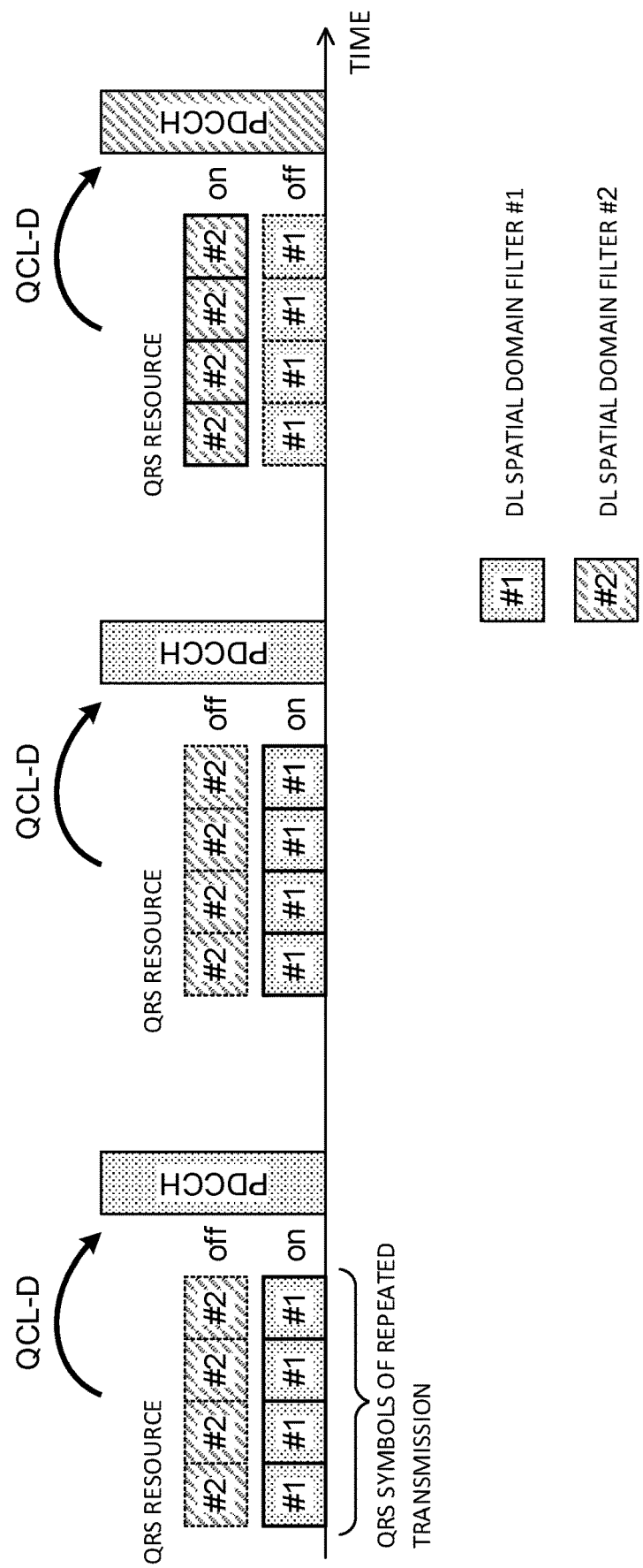
FIG. 10 is a diagram illustrating another example of the TCI state (QCL assumption) changing operation.

Furthermore, the number of resources configured for the QRS (or the number of transmission spatial domain filters applied to the QRS) may be limited to a given number or less (see FIG. 10). FIG. 10 illustrates an example in a case where the number of QRS resources (or transmission spatial domain filters applied to the QRS) is two or less.

Furthermore, a configuration may be made in which the QRS resource used for QRS transmission is changed only when the QCL (or TCI state) for the PDCCH (or QRS) is changed. For example, FIG. 10 illustrates a case where the QRS resource to which the QRS is transmitted changes when the QCL is changed (for example, when the transmission spatial domain filter applied to the PDCCH is changed).

Furthermore, FIG. 10 illustrates a case where the QRS is repeatedly transmitted a plurality of times (here, four times), but this is not a limitation. For example, the UE may perform reception in the QRS resource assuming the given reception spatial domain filter. In this case, the base station may transmit the QRS by using at least one symbol in the QRS resource (see FIG. 11). The given reception spatial domain filter may be a reception spatial domain filter applied in the past (or most recently) (for example, a reception spatial domain filter selected by reception beam sweeping).

Figure 11:
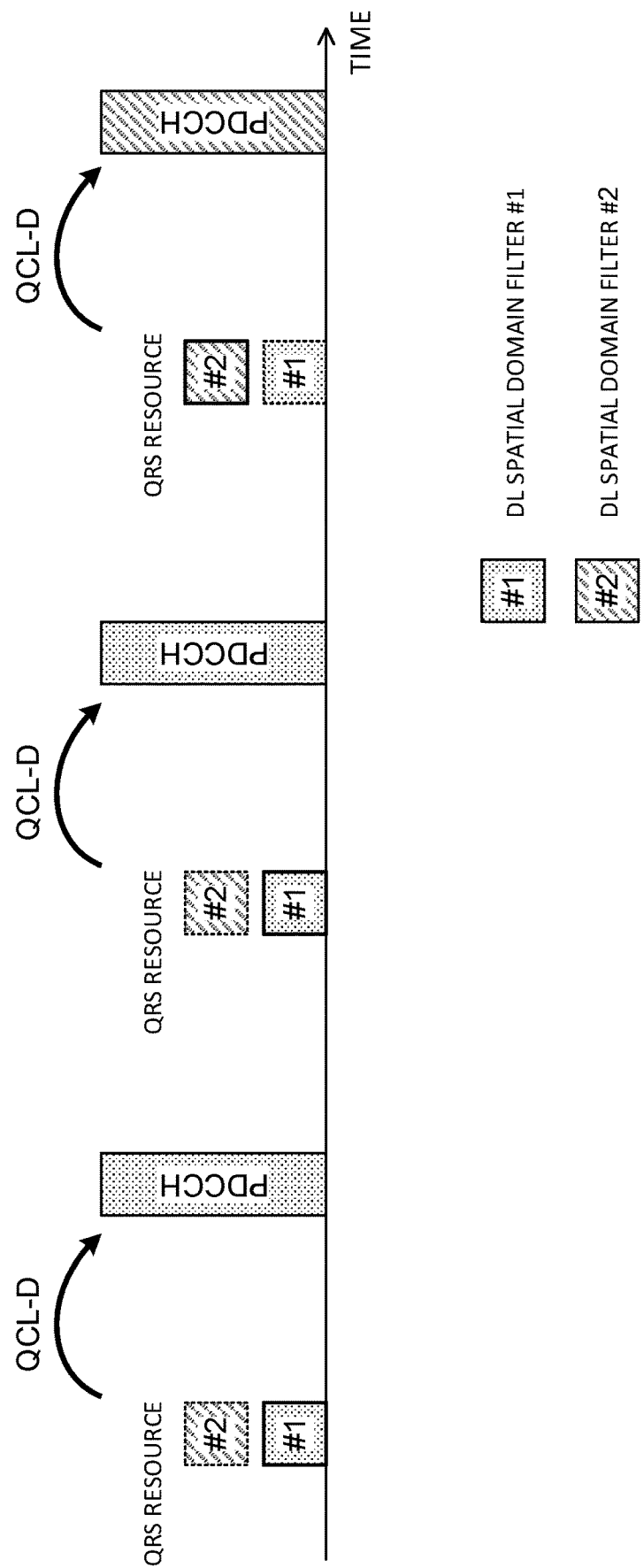
FIG. 11 is a diagram illustrating another example of the TCI state (QCL assumption) changing operation.

In FIG. 11, the UE receives the QRS by applying the given reception spatial domain filter to the QRS resource #1 and the QRS resource #2. Note that, the reception spatial domain filters applied to reception in different QRS resources may be the same as each other, or different from each other. The UE determines the transmission spatial domain filter applied to the QRS on the basis of the QRS resource detecting the QRS, and receives the PDCCH assuming that the QRS and the PDCCH have a QCL relation.

As a result, a configuration can be made in which a plurality of symbols is not configured as the QRS resources, so that the resource utilization efficiency can be improved.

(Variation 1)

When a QCL resource is configured, a case is also assumed where the QCL resource overlaps with another channel (for example, PDSCH). In such a case, the UE may perform the following operation 1 or operation 2.

<Operation 1>

The UE may perform rate matching or puncturing of the PDSCH only when the QRS is actually transmitted.

PDSCH rate matching processing refers to controlling the number of bits after encoding (encoded bits) in consideration of actually available radio resources. When the number of encoded bits is less than the number of bits that can be mapped to the actually available radio resources, at least some of the encoded bits may be repeated. When the number of encoded bits is larger than the number of bits that can be mapped, some of the encoded bits may be deleted.

PDSCH puncture processing performs encoding assuming that the resources allocated for the PDSCH can be used (or without considering the amount of unusable resources), but may mean that the encoded symbols are not mapped to actually unavailable resources (resources are freed). On the reception side, by not using the encoded symbol of the punctured resource for decoding, it is possible to suppress the characteristics degradation due to the puncture.

When processing is performed on the PDSCH only when the QRS is actually transmitted, it is preferable to apply the puncture processing considering that the QRS actually transmitted is missed.

<Operation 2>

The UE may perform rate matching or puncturing of the PDSCH that overlaps with the QRS resource, regardless of whether the QRS is actually transmitted. Note that, when processing is performed on the PDSCH regardless of QRS transmission, it is preferable to apply rate matching processing.

(Variation 2)

The UE may apply a TCI state configured in one CORESET to another CORESET. For example, when no TCI state is configured for a CORESET #X, the UE may apply a TCI state (or QCL) configured by another CORESET (for example, a CORESET #X-1) to the CORESET #X.

The other CORESET may be a CORESET with a smaller index. For example, when no TCI state is configured in the CORESETs #1 and #2, the UE may apply the QCL in the CORESET #0 to the CORESETs #1 and #2.

As described above, by applying a TCI state (QCL assumption) of a given CORESET to other CORESETs, it becomes unnecessary to configure the TCI states respectively for the CORESETs. As a result, the network (or the base station) only needs to configure the TCI state for at least one of a plurality of CORESETs (for example, the CORESET with the smallest index), so that it becomes possible to reduce the TCI state configuration operation.

(Variation 3)

When applying QCL specified by a QRS to a PDCCH, the UE may be configured to apply the QCL to the PDCCH after a lapse of a given period after receiving the QRS. For example, the UE may apply QCL (or reception spatial domain filter) specified on the basis of the QRS to the reception of the PDCCH after a given period (T) after receiving the QCL (see FIG. 12).

Figure 12:
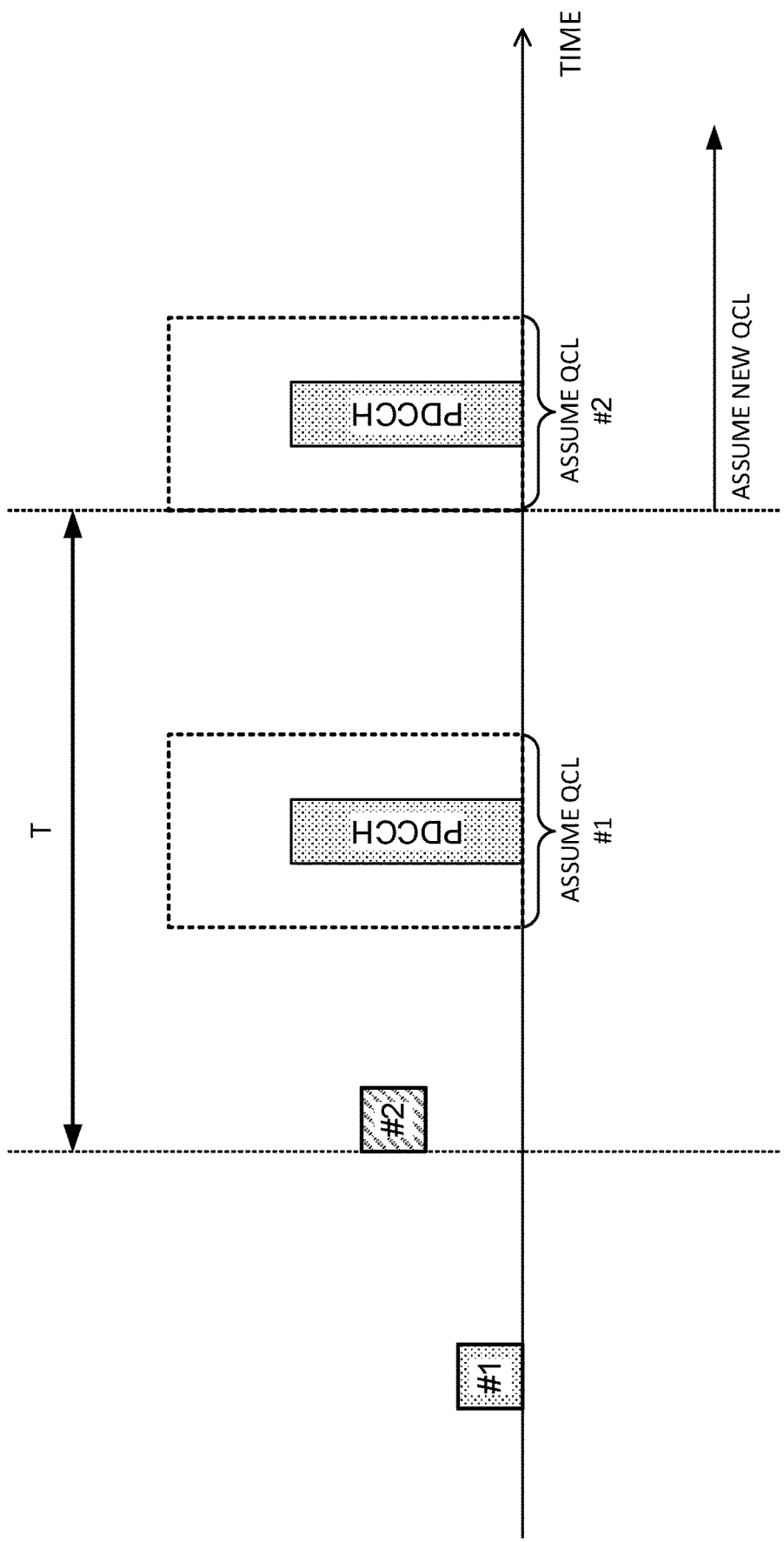
FIG. 12 is a diagram illustrating another example of the TCI state (QCL assumption) changing operation.

FIG. 12 illustrates a case where the QCL is changed (or updated) from 1 to 2 by the QRS. Even when receiving a QRS that specifies second QCL #2 (or transmission spatial domain filter #2), the UE receives the PDCCH assuming the QCL before the change (here, QCL #1) until the given period (T) elapses after receiving the QRS. Furthermore, a time domain to which the QCL specified by the QRS is applied may be configured.

(Variation 4)

It is also conceivable that the UE receives the PDCCH/PDSCH by using a plurality of transmission/reception points (TRPs). In this case, it is necessary to appropriately configure the TCI state (or reference signal) when applying the single TRP and when applying the multi-TRP. Note that, the TRP may be replaced with a DMRS port group, a panel, and a codeword.

For example, as illustrated in FIG. 4, when a plurality of TCI states is configured (or when a plurality of reference signals corresponding to each TCI state is configured), all the reference signals (for example, TRSs #1-#3) may be configured in association with each TRP (or DMRS port group, panel, codeword, PDSCH). That is, the same TRSs #1-#3 may be configured in each TRP.

Alternatively, the RS corresponding to the TCI state configured for each CORESET may be configured separately for each TRP (or DMRS port group, panel, codeword, PDSCH). For example, the TRS #1 (or SSB #1) may be configured for a TRP 1 (or DMRS port group 1), and the TRS #3 (or CSI-RS #1) may be configured for a TRP 2 (or DMRS port group 2).

When the multi-TRP is applied, the UE may perform reception processing in consideration of all the configured TCI states in the detection of PDCCH/PDSCH. Alternatively, the UE may detect the PDCCH/PDSCH in consideration of a combination of the configured TCI states (for example, a combination of QCL characteristics of different TRPS).

(Radio Communication System)

Hereinafter, a configuration is described of a radio communication system according to an embodiment of the present disclosure. In this radio communication system, communication is performed using one or a combination of the radio communication methods according to the embodiments of the present disclosure.

Figure 13:
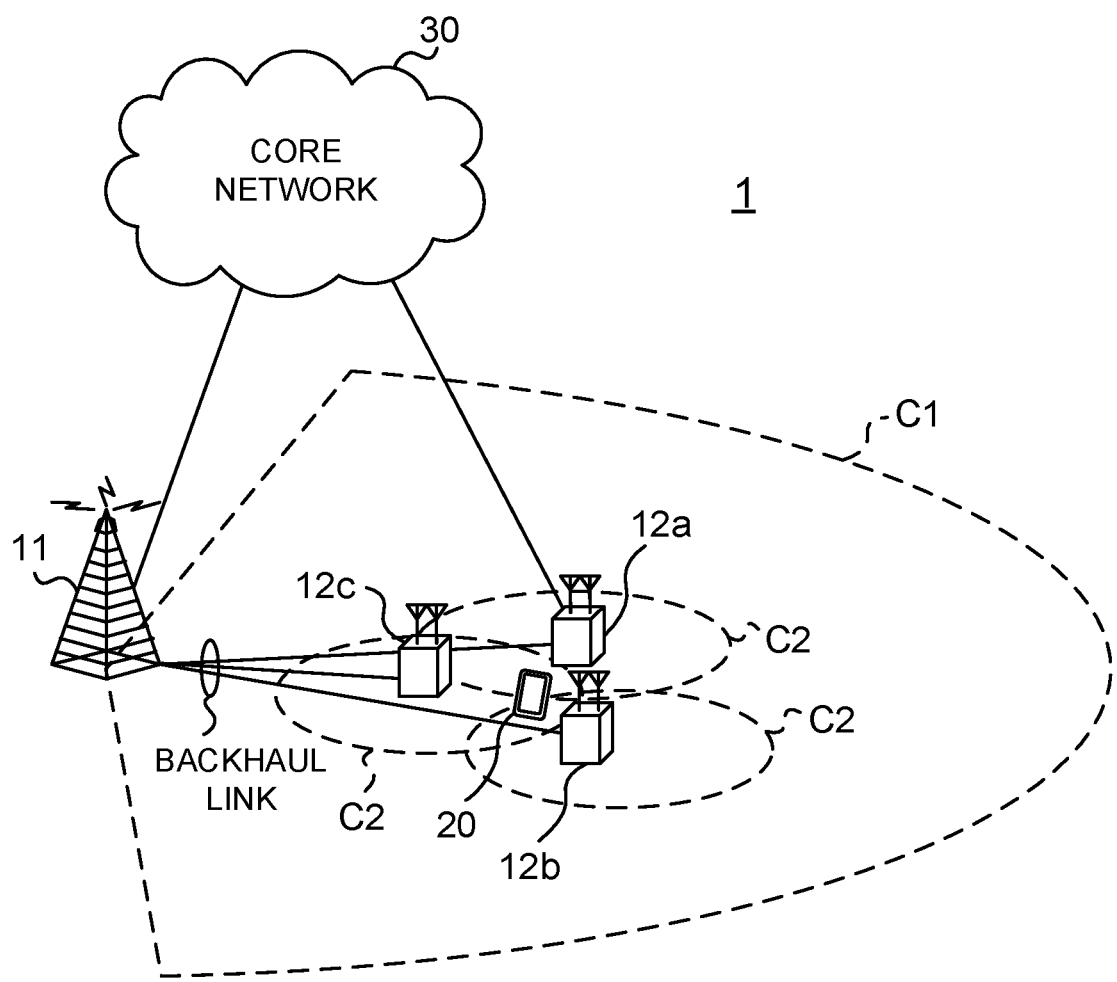
FIG. 13 is a diagram illustrating an example of a schematic configuration of a radio communication system according to an embodiment.

FIG. 13 is a diagram illustrating an example of a schematic configuration of a radio communication system according to an embodiment. A radio communication system 1 may be a system that implements communication using Long Term Evolution (LTE), 5th generation mobile communication system New Radio (5G NR), and the like specified by Third Generation Partnership Project (3GPP).

Furthermore, the radio communication system 1 may support dual connectivity (multi-Radio Access Technology (RAT) Dual Connectivity (MR-DC)) between a plurality of RATS. The MR-DC may include dual connectivity between LTE (evolved universal terrestrial radio access (E-UTRA)) and NR (E-UTRA-NR dual connectivity (EN-DC)), dual connectivity between NR and LTE (NR-E-UTRA dual connectivity (NE-DC)), and the like.

In EN-DC, an LTE (E-UTRA) base station (eNB) is a Master Node (MN), and an NR base station (gNB) is a Secondary Node (SN). In NE-DC, an NR base station (gNB) is MN, and an LTE (E-UTRA) base station (eNB) is SN.

The radio communication system 1 may support dual connectivity between a plurality of base stations in identical RAT (for example, dual connectivity in which both MN and SN are NR base stations (gNB) (NR-NR Dual Connectivity (NN-DC)).

The radio communication system 1 may include a base station 11 that forms a macro cell C1 with a relatively wide coverage, and base stations 12 (12a to 12c) that are arranged in the macro cell C1 and that form small cells C2 narrower than the macro cell C1. A user terminal 20 may be located in at least one cell. The arrangement, number, and the like of cells and the user terminals 20 are not limited to the aspect illustrated in the drawing. Hereinafter, the base stations 11 and 12 will be collectively referred to as "base stations 10", unless these are distinguished from each other.

The user terminal 20 may be connected to at least one of the plurality of base stations 10. The user terminal 20 may use at least one of Carrier Aggregation and Dual Connectivity (DC) using a plurality of Component Carriers (CC).

Each CC may be included in at least one of a Frequency Range 1 (FR1) or a Frequency Range 2 (FR2). The macro cell C1 may be included in the FR1, and the small cell C2 may be included in the FR2. For example, the FR1 may be a frequency range of 6 GHz or less (sub-6 GHz), and the FR2 may be a frequency range higher than 24 GHz (above-24 GHz). Note that, the frequency ranges, definitions, and the like of the FR1 and FR2 are not limited to these, and for example, the FR1 may be a frequency range higher than the FR2.

Furthermore, the user terminal 20 may perform communication in each CC by using at least one of Time Division Duplex (TDD) or Frequency Division Duplex (FDD).

The plurality of base stations 10 may be connected to each other by wire (for example, an optical fiber or an X2 interface, or the like in compliance with Common Public Radio Interface (CPRI)) or by radio (for example, NR communication). For example, when NR communication is used as a backhaul between the base stations 11 and 12, the base station 11 corresponding to a higher-level station may be referred to as an Integrated Access Backhaul (IAB) donor, and the base station 12 corresponding to a relay station (relay) may be referred to as an IAB node.

A base station 10 may be connected to a core network 30 via another base station 10 or directly. The core network 30 may include, for example, at least one of Evolved Packet Core (EPC), 5G Core Network (5GCN), Next Generation Core (NGC), or the like.

The user terminal 20 may correspond to at least one of communication methods such as LTE, LTE-A, and 5G.

In the radio communication system 1, an Orthogonal Frequency Division Multiplexing (OFDM)-based radio access method may be used. For example, in at least one of Downlink (DL) or Uplink (UL), Cyclic Prefix OFDM (CP-OFDM), Discrete Fourier Transform Spread OFDM (DFT-s-OFDM), orthogonal Frequency Division Multiple Access (OFDMA), Single Carrier Frequency Division Multiple Access (SC-FDMA), and the like may be used.

The radio access method may be referred to as a waveform. Note that, in the radio communication system 1, another radio access method (for example, another single carrier transmission method or another multi-carrier transmission method) may be used as the UL and DL radio access methods.

In the radio communication system 1, as a downlink channel, a Physical Downlink Shared Channel (PDSCH) shared by the user terminals 20, a Physical Broadcast Channel (PBCH), a Physical Downlink Control Channel (PDCCH), or the like may be used.

Furthermore, in the radio communication system 1, as an uplink channel, a Physical Uplink Shared Channel (PUSCH) shared by the user terminals 20, a Physical Uplink Control Channel (PUCCH), a Physical Random Access Channel (PRACH), or the like may be used.

User data, higher layer control information, a System Information Block (SIB), and the like are transmitted by the PDSCH. User data, higher layer control information, and the like may be transmitted by the PUSCH. Furthermore, a Master Information Block (MIB) may be transmitted by the PBCH.

Lower layer control information may be transmitted by the PDCCH. The lower layer control information may include, for example, Downlink Control Information (DCI) including scheduling information of at least one of the PDSCH and the PUSCH.

Note that, the DCI that schedules the PDSCH may be referred to as DL assignment, DL DCI, and the like, and the DCI that schedules the PUSCH may be referred to as UL grant, UL DCI, and the like. Note that, the PDSCH may be replaced with DL data, and the PUSCH may be replaced with UL data.

For detection of the PDCCH, a control resource set (CORESET) and a search space may be used. The CORESET corresponds to a resource that searches for DCI. The search space corresponds to a search area and a search method for PDCCH candidates. One CORESET may be associated with one or a plurality of search spaces. The UE may monitor the CORESET associated with a certain search space on the basis of search space configuration.

One SS may correspond to a PDCCH candidate corresponding to one or a plurality of aggregation Levels. One or a plurality of search spaces may be referred to as a search space set. Note that, "search space", "search space set", "search space configuration", "search space set configuration", "CORESET", "CORESET configuration", and the like in the present disclosure may be replaced with each other.

Delivery confirmation information (which may be referred to as, for example, hybrid automatic repeat request (HARQ-ACK), ACK/NACK, or the like), Scheduling Request (SR), and the like of Channel State Information (CSI) may be transmitted by the PUCCH. A random access preamble for establishing a connection with a cell may be transmitted by the PRACH.

Note that, in the present disclosure, downlink, uplink, and the like may be expressed without adding "link". Furthermore, various channels may be expressed without adding "physical" at the beginning thereof.

In the radio communication system 1, a Synchronization Signal (SS), a Downlink Reference Signal (DL-RS), and the like may be transmitted. In the radio communication system 1, a Cell-specific Reference Signal (CRS), a Channel State Information Reference Signal (CSI-RS), a demodulation reference signal (DMRS), a Positioning Reference Signal (PRS), a Phase Tracking Reference Signal (PTRS), and the like may be transmitted as the DL-RS.

The synchronization signal may be, for example, at least one of a Primary Synchronization Signal (PSS) and a Secondary Synchronization Signal (SSS). A signal block including the SS (PSS or SSS) and the PBCH (and the DMRS for the PBCH) may be referred to as an SS/PBCH block, an SSB (SS Block), and the like. Note that, the SS, the SSB, or the like may also be referred to as a reference signal.

Furthermore, in the radio communication system 1, a Sounding Reference Signal (SRS), a Demodulation Reference Signal (DMRS), and the like may be transmitted as an Uplink Reference Signal (UL-RS). Note that, the DMRS may be referred to as a user terminal-specific reference signal (UE-specific Reference Signal)".

(Base Station)

Figure 14:
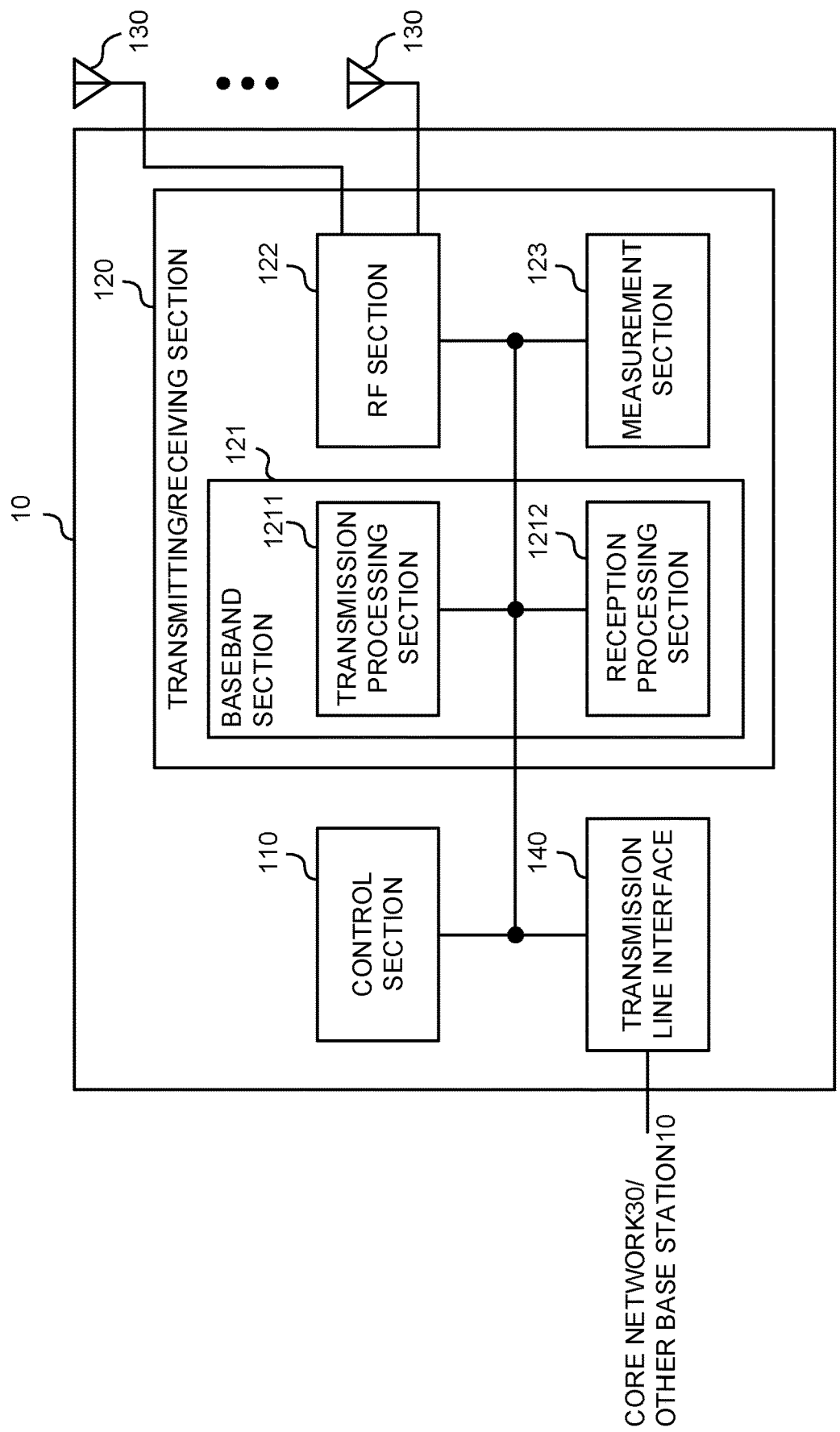
FIG. 14 is a diagram illustrating an example of a configuration of a base station according to an embodiment.

FIG. 14 is a diagram illustrating an example of a configuration of a base station according to an embodiment. The base station 10 includes a control section 110, a transmitting/receiving section 120, a transmission/reception antenna 130, and a transmission line interface 140. Note that, one or more each of the control sections 110, the transmitting/receiving sections 120, the transmission/reception antennas 130, and the transmission line interfaces 140 may be included.

Note that, although this example mainly describes functional blocks of a characteristic part of the present embodiment, it may be assumed that the base station 10 includes other functional blocks that are necessary for radio communication as well. A part of processing of each section described below may be omitted.

The control section 110 controls the entire base station 10. The control section 110 can include a controller, a control circuit, and the like that are described on the basis of common recognition in the technical field related to the present disclosure.

The control section 110 may control signal generation, scheduling (for example, resource allocation or mapping), and the like. The control section 110 may control transmission/reception, measurement, and the like using the transmitting/receiving section 120, the transmission/reception antenna 130, and the transmission line interface 140. The control section 110 may generate data, control information, a sequence, and the like to be transmitted as signals, and transfer the data, control information, sequence, and the like to the transmitting/receiving section 120. The control section 110 may perform call processing (such as configuration or releasing) of a communication channel, state management of the base station 10, and management of a radio resource.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can include a transmitter/receiver, an RF circuit, a baseband circuit, a filter, a phase shifter, a measurement circuit, a transmission/reception circuit, and the like that are described on the basis of common recognition in the technical field related to the present disclosure.

The transmitting/receiving section 120 may be formed as an integrated transmitting/receiving section, or may include a transmitting section and a receiving section. The transmitting section may include the transmission processing section 1211 and the RF section 122. The receiving section may include the reception processing section 1212, the RF section 122, and the measurement section 123.

The transmission/reception antenna 130 can include an antenna described on the basis of common recognition in the technical field related to the present disclosure, for example, an array antenna.

The transmitting/receiving section 120 may transmit the above-described downlink channel, synchronization signal, downlink reference signal, and the like. The transmitting/receiving section 120 may receive the above-described uplink channel, uplink reference signal, and the like.

The transmitting/receiving section 120 may form at least one of a transmission beam or a reception beam by using digital beam forming (for example, precoding), analog beam forming (for example, phase rotation), and the like.

The transmitting/receiving section 120 (transmission processing section 1211) may perform Packet Data Convergence Protocol (PDCP) layer processing, Radio Link Control (RLC) layer processing (for example, RLC retransmission control), Medium Access Control (MAC) layer processing (for example, HARQ retransmission control), and the like on, for example, data, control information, and the like acquired from the control section 110, to generate a bit string to be transmitted.

The transmitting/receiving section 120 (transmission processing section 1211) may perform transmission processing such as channel encoding (which may include error correction encoding), modulation, mapping, filtering processing, Discrete Fourier Transform (DFT) processing (if necessary), Inverse Fast Fourier Transform (IFFT) processing, precoding, or digital-analog conversion on the bit string to be transmitted, to output a baseband signal.

The transmitting/receiving section 120 (RF section 122) may perform modulation to a radio frequency range, filtering processing, amplification, and the like on the baseband signal, to transmit a signal in the radio frequency range via the transmission/reception antenna 130.

Meanwhile, the transmitting/receiving section 120 (RF section 122) may perform amplification, filtering processing, demodulation to a baseband signal, and the like on the signal in the radio frequency range received by the transmission/reception antenna 130.

The transmitting/receiving section 120 (reception processing section 1212) may apply reception processing such as analog-digital conversion, Fast Fourier Transform (FFT) processing, Inverse Discrete Fourier Transform (IDFT) processing (if necessary), filtering processing, demapping, demodulation, decoding (which may include error correction decoding), MAC layer processing, RLC layer processing, or PDCP layer processing on the acquired baseband signal, to acquire user data and the like.

The transmitting/receiving section 120 (measurement section 123) may perform measurement on the received signal. For example, the measurement section 123 may perform Radio Resource Management (RRM) measurement, Channel State Information (CSI) measurement, and the like on the basis of the received signal. The measurement section 123 may measure received power (for example, Reference Signal Received Power (RSRP)), received quality (for example, Reference Signal Received Quality (RSRQ), Signal To Interference plus Noise Ratio (SINR), or Signal to Noise Ratio (SNR)), signal strength (for example, Received Signal Strength Indicator (RSSI)), propagation path information (for example, CSI), and the like. The measurement result may be output to the control section 110.

The transmission line interface 140 may perform transmission/reception of a signal (backhaul signaling) to/from an apparatus, another base station 10, or the like included in the core network 30, and may perform acquisition, transmission, or the like of user data (user plane data), control plane data, and the like for the user terminal 20.

Note that, the transmitting section and the receiving section of the base station 10 in the present disclosure may include at least one of the transmitting/receiving section 120, the transmission/reception antenna 130, or the transmission line interface 140.

Note that, the transmitting/receiving section 120 transmits information regarding a plurality of reference signals associated with one or more Transmission Configuration Indicator (TCI) states. Furthermore, the transmitting/receiving section 120 may transmit a downlink physical channel (for example, at least one of the PDCCH or PDSCH) assuming quasi-co-location with at least one of the plurality of reference signals.

Furthermore, the transmitting/receiving section 120 may repeatedly transmit a given reference signal associated with the transmission configuration indicator (TCI) state by using different transmission spatial domain filters over a given time domain.

The control section 110 controls configuration of the reference signal for one or more transmission configuration Indicator (TCI) states. Furthermore, the control section 110 controls transmission of the downlink physical channel so that the downlink physical channel is quasi-co-location with at least one of the plurality of reference signals.

(User Terminal)

Figure 15:
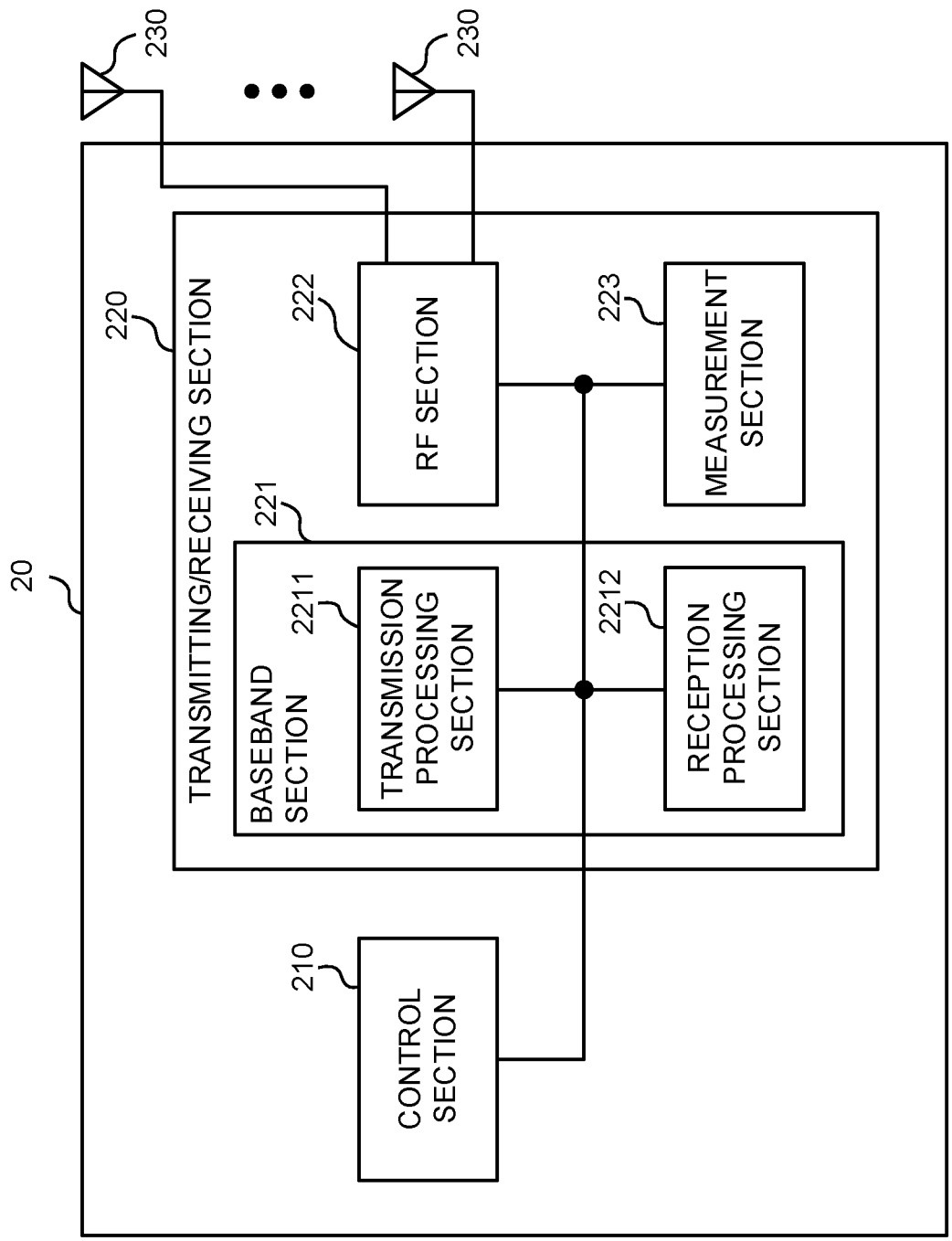
FIG. 15 is a diagram illustrating an example of a configuration of a user terminal according to an embodiment.

FIG. 15 is a diagram illustrating an example of a configuration of a user terminal according to an embodiment. The user terminal 20 includes a control section 210, a transmitting/receiving section 220, and a transmission/reception antenna 230. Note that, one or more each of the control sections 210, the transmitting/receiving sections 220, and the transmission/reception antennas 230 may be included.

Note that, although this example mainly describes functional blocks of a characteristic part of the present embodiment, it may be assumed that the user terminal 20 includes other functional blocks that are necessary for radio communication as well. A part of processing of each section described below may be omitted.

The control section 210 controls the entire user terminal 20. The control section 210 can include a controller, a control circuit, and the like that are described on the basis of common recognition in the technical field related to the present disclosure.

The control section 210 may control signal generation, mapping, and the like. The control section 210 may control transmission/reception, measurement, and the like using the transmitting/receiving section 220 and the transmission/reception antenna 230. The control section 210 may generate data, control information, a sequence, and the like to be transmitted as signals, and may transfer the data, control information, sequence, and the like to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can include a transmitter/receiver, an RF circuit, a baseband circuit, a filter, a phase shifter, a measurement circuit, a transmission/reception circuit, and the like that are described on the basis of common recognition in the technical field related to the present disclosure.

The transmitting/receiving section 220 may be formed as an integrated transmitting/receiving section, or may include a transmitting section and a receiving section. The transmitting section may include the transmission processing section 2211 and the RF section 222. The receiving section may include the reception processing section 2212, the RF section 222, and the measurement section 223.

The transmission/reception antenna 230 can include an antenna described on the basis of common recognition in the technical field related to the present disclosure, for example, an array antenna.

The transmitting/receiving section 220 may receive the above-described downlink channel, synchronization signal, downlink reference signal, and the like. The transmitting/receiving section 220 may transmit the above-described uplink channel, uplink reference signal, and the like.

The transmitting/receiving section 220 may form at least one of a transmission beam or a reception beam by using digital beam forming (for example, precoding), analog beam forming (for example, phase rotation), and the like.

The transmitting/receiving section 220 (transmission processing section 2211) may perform PDCP layer processing, RLC layer processing (for example, RLC retransmission control), MAC layer processing (for example, HARQ retransmission control), and the like on, for example, data, control information, and the like acquired from the control section 210, to generate a bit string to be transmitted.

The transmitting/receiving section 220 (transmission processing section 2211) may perform transmission processing such as channel encoding (which may include error correction encoding), modulation, mapping, filtering processing, DFT processing (if necessary), IFFT processing, precoding, or digital-analog conversion on the bit string to be transmitted, to output a baseband signal.

Note that, whether or not to apply DFT processing may be determined on the basis of configuration of transform precoding. If transform precoding is enabled for a channel (for example, PUSCH), the transmitting/receiving section 220 (transmission processing section 2211) may perform DFT processing as the transmission processing to transmit the channel by using a DFT-s-OFDM waveform, and if not, DFT processing does not have to be performed as the transmission processing.

The transmitting/receiving section 220 (RF section 222) may perform modulation to a radio frequency range, filtering processing, amplification, and the like on the baseband signal, to transmit a signal in the radio frequency range via the transmission/reception antenna 230.

Meanwhile, the transmitting/receiving section 220 (RF section 222) may perform amplification, filtering processing, demodulation to a baseband signal, and the like on the signal in the radio frequency range received by the transmission/reception antenna 230.

The transmitting/receiving section 220 (reception processing section 2212) may apply reception processing such as analog-digital conversion, FFT processing, IDFT processing (if necessary), filtering processing, demapping, demodulation, decoding (which may include error correction decoding), MAC layer processing, RLC layer processing, or PDCP layer processing on the acquired baseband signal, to acquire user data and the like.

The transmitting/receiving section 220 (measurement section 223) may perform measurement on the received signal. For example, the measurement section 223 may perform RRM measurement, CSI measurement, and the like on the basis of the received signal. The measurement section 223 may measure received power (for example, RSRP), received quality (for example, RSRQ, SINR, or SNR), signal strength (for example, RSSI), propagation path information (for example, CSI), and the like. The measurement result may be output to the control section 210.

Note that, the transmitting section and the receiving section of the user terminal 20 in the present disclosure may include at least one of the transmitting/receiving section 220, the transmission/reception antenna 230, or the transmission line interface 240.

Note that, the transmitting/receiving section 220 receives information regarding a plurality of reference signals associated with one or more Transmission Configuration Indicator (TCI) states. Furthermore, the transmitting/receiving section 220 may receive the downlink physical channel (for example, at least one of the PDCCH or PDSCH) assuming quasi-co-location with at least one of the plurality of reference signals. The plurality of reference signals may be respectively associated with different TCI states. The plurality of reference signals may be source reference signals associated with a given reference signal configured for one TCI state.

Furthermore, the transmitting/receiving section 220 may repeatedly receive a given reference signal associated with the transmission configuration indicator (TCI) state by using different reception spatial domain filters over a given time domain. The transmitting/receiving section 220 may receive the downlink physical channel by applying the given reception spatial domain filter determined on the basis of repeated reception of a given reference signal. Note that, any one of the plurality of transmission spatial domain filters may be applied to a given reference signal transmitted by a given resource configured in advance.

The control section 210 may determine a source reference signal to be quasi-co-located with the given reference signal on the basis of a reception result of the given reference signal. Furthermore, the control section 210 may assume that an identical TCI state is applied to a downlink control channel and a downlink shared channel scheduled in the downlink control channel.

Alternatively, the control section 210 may assume that given reference signals to which different transmission spatial domain filters are applied are respectively allocated to different resources. Furthermore, the control section 210 may assume that the resource to which the given reference signal is allocated changes when the quasi-co-location of the given reference signal changes.

(Hardware Configuration)

Note that, the block diagrams that have been used to describe the above embodiments illustrate blocks of functional units. These functional blocks (configuration sections) may be implemented by an arbitrary combination of at least one of hardware or software. Furthermore, an implementation method for each functional block is not particularly limited. That is, each functional block may be implemented by using one apparatus physically or logically aggregated, or may be implemented by directly or indirectly connecting two or more physically or logically separate apparatuses (by using wires, radio, or the like, for example) and using these plural apparatuses. The functional block may be implemented by combining the one or the plural apparatuses with software.

Here, functions include, but are not limited to, determining, determining, judging, computing, calculating, processing, deriving, investigating, searching, ascertaining, receiving, transmitting, outputting, accessing, resolving, selecting, choosing, establishing, comparing, assuming, expecting, considering, broadcasting, notifying, communicating, forwarding, configuring, reconfiguring, allocating, mapping, and assigning. For example, a functional block (configuration section) having a transmission function may be referred to as a transmitting unit, a transmitter, and the like. In any case, as described above, the implementation method is not particularly limited.

Figure 16:
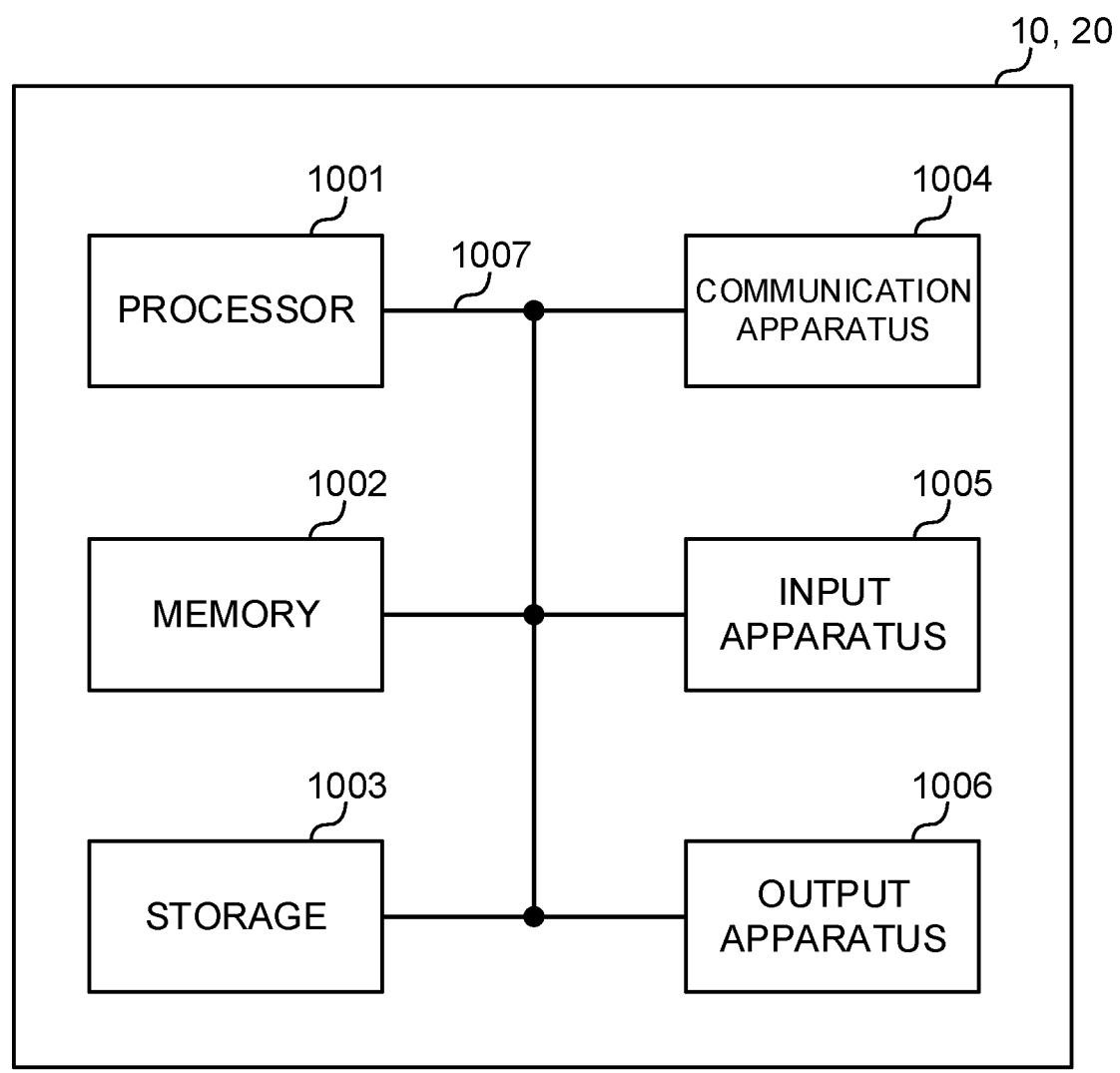
FIG. 16 is a diagram illustrating an example of a hardware configuration of the base station and the user terminal according to an embodiment.

For example, the base station, the user terminal, and the like according to an embodiment of the present disclosure may function as a computer that executes the processing of the radio communication method of the present disclosure. FIG. 16 is a diagram illustrating an example of a hardware configuration of the base station and the user terminal according to an embodiment. Physically, the base station 10 and user terminal 20 described above may be formed as a computer apparatus that includes a processor 1001, a memory 1002, storage 1003, a communication apparatus 1004, an input apparatus 1005, an output apparatus 1006, a bus 1007, and the like.

Note that, in the present disclosure, the terms such as an apparatus, a circuit, a device, a section, or a unit can be replaced with each other. The hardware configuration of the base station 10 and the user terminal 20 may be configured including one or a plurality of the apparatuses illustrated in the drawings, or may be configured without including some apparatuses.

For example, although only one processor 1001 is illustrated, there may be a plurality of processors. Furthermore, the processing may be executed by one processor, or the processing may be executed by two or more processors simultaneously, sequentially, or using other techniques. Note that, the processor 1001 may be implemented with one or more chips.

For example, each function of the base station 10 and user terminal 20 is implemented by causing given software (program) to be read onto hardware such as the processor 1001 and the memory 1002, and by the processor 1001 performing arithmetic operation to control communication via the communication apparatus 1004 and control at least one of reading or writing of data in the memory 1002 and storage 1003.

The processor 1001 operates an operating system to control an entire computer, for example. The processor 1001 may include a central processing unit (CPU) including an interface with peripheral equipment, a control apparatus, an operation apparatus, a register, and the like. For example, at least a part of the control section 110 (210), transmitting/ receiving section 120 (220), and the like described above may be implemented by the processor 1001.

Furthermore, the processor 1001 reads a program (program code), a software module, data, and the like from at least one of the storage 1003 or the communication apparatus 1004 into the memory 1002, and executes various types of processing in accordance with these. As the program, a program is used that causes a computer to execute at least a part of the operation described in the embodiment described above. For example, the control section 110 (210) may be implemented by a control program that is stored in the memory 1002 and operates in the processor 1001, and another functional block may be implemented similarly.

The memory 1002 is a computer-readable recording medium, and may include, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a register, a cache, a main memory (main storage apparatus), and the like. The memory 1002 may store a program (program code), a software module, and the like executable for implementing the radio communication method according to an embodiment of the present disclosure.

The storage 1003 is a computer-readable recording medium, and may include, for example, at least one of a flexible disk, a floppy (registered trademark) disk, a magneto-optical disk (for example, a compact disc (compact disc ROM (CD-ROM) and the like), a digital versatile disc, and a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as an auxiliary storage apparatus.

The communication apparatus 1004 is hardware (transmission/reception device) for performing inter-computer communication via at least one of a wired network or a radio network, and is also referred to as a network device, a network controller, a network card, a communication module, and the like, for example. The communication apparatus 1004 may include a high frequency switch, a duplexer, a filter, a frequency synthesizer, and the like to implement, for example, at least one of Frequency Division Duplex (FDD) or Time Division Duplex (TDD). For example, the transmitting/receiving section 120 (220), the transmission/reception antenna 130 (230), and the like described above may be implemented by the communication apparatus 1004. The transmitting/receiving section 120 (220) may be implemented by being physically or logically separated into the transmitting section 120a (220a) and the receiving section 120b (220b).

The input apparatus 1005 is an input device that receives an input from outside (for example, a keyboard, a mouse, a microphone, a switch, a button, a sensor, and the like). The output apparatus 1006 is an output device for performing output to the outside (for example, a display, a speaker, a Light Emitting Diode (LED) lamp, and the like). Note that, the input apparatus 1005 and output apparatus 1006 may have an integrated form (for example, a touch panel).

Furthermore, apparatuses such as the processor 1001 and the memory 1002 are connected to each other by the bus 1007 for communicating information. The bus 1007 may be formed by using a single bus, or may be formed by using different buses for respective connections between apparatuses.

Furthermore, the base station 10 and user terminal 20 may include hardware such as a microprocessor, a Digital Signal Processor (DSP), an Application Specific Integrated Circuit (ASIC), a Programmable Logic Device (PLD), or a Field Programmable Gate Array (FPGA), and some or all of the functional blocks may be implemented by using the hardware. For example, the processor 1001 may be implemented by using at least one of these pieces of hardware.

(Variations)

Note that, terms described in the present disclosure and terms necessary for understanding the present disclosure may be replaced with other terms that have the same or similar meanings. For example, a channel, a symbol, and a signal (or signaling) may be replaced with each other. Furthermore, the signal may be a message. A reference signal can be abbreviated as an RS, and may be referred to as a pilot, a pilot signal, and the like, depending on the standard applied. Furthermore, a Component Carrier (CC) may be referred to as a cell, a frequency carrier, a carrier frequency, and the like.

A radio frame may include one or a plurality of periods (frames) in a time domain. Each of one or a plurality of periods (frames) constituting a radio frame may be referred to as a subframe. Moreover, the subframe may include one or a plurality of slots in the time domain. The subframe may have a fixed time length (for example, 1 ms) that does not depend on numerology.

Here, the numerology may be a communication parameter applied to at least one of transmission and reception of a certain signal or channel. For example, the numerology may indicate at least one of Subcarrier Spacing (SCS), a bandwidth, a symbol length, a cyclic prefix length, a Transmission Time Interval (TTI), the number of symbols per TTI, a radio frame configuration, specific filtering processing to be performed by a transceiver in a frequency domain, specific windowing processing to be performed by the transceiver in the time domain, and the like.

A slot may include one or a plurality of symbols (Orthogonal Frequency Division Multiplexing (OFDM) symbols, Single Carrier Frequency Division Multiple Access (SC-FDMA) symbols, and the like) in the time domain. Furthermore, the slot may be a time unit based on the numerology.

The slot may include a plurality of mini slots. Each mini slot may include one or a plurality of symbols in the time domain. Furthermore, a mini slot may be referred to as a sub-slot. Each mini slot may include fewer symbols than a slot. A PDSCH (or PUSCH) transmitted in a time unit larger than a mini slot may be referred to as a PDSCH (PUSCH) mapping type A. A PDSCH (or PUSCH) transmitted using the mini slot may be referred to as a PDSCH (PUSCH) mapping type B.

The radio frame, subframe, slot, mini slot, and symbol all represent a time unit when transmitting a signal. Another name may be used corresponding to each of the radio frame, subframe, slot, mini slot, and symbol. Note that, the time units such as the frame, subframe, slot, mini slot, and symbol in the present disclosure may be replaced with each other.

For example, one subframe may be referred to as a TTI, a plurality of consecutive subframes may be referred to as a TTI, or one slot or one mini slot may be referred to as a TTI. That is, at least one of the subframe and TTI may be a subframe (1 ms) in the existing LTE, may be a period shorter than 1 ms (for example, one to thirteen symbols), or may be a period longer than 1 ms. Note that, the unit indicating the TTI may be referred to as the slot, mini slot, and the like instead of the subframe.

Here, the TTI refers to, for example, the minimum time unit of scheduling in the radio communication. For example, in LTE systems, the base station performs scheduling for allocating the radio resources (such as the frequency bandwidth and transmission power that can be used in each user terminal) to each user terminal in TTI units. Note that, definition of the TTI is not limited to this.

The TTI may be a transmission time unit of channel coded data packet (transport block), code block, codeword, and the like, or may be a processing unit of scheduling, link adaptation, and the like. Note that, when the TTI is given, a time interval (for example, the number of symbols) to which the transport block, code block, codeword, and the like are actually mapped may be shorter than the TTI.

Note that, when one slot or one mini slot is referred to as the TTI, one or more TTIs (that is, one or more slots or one or more mini slots) may be the minimum time unit of scheduling. Furthermore, the number of slots (the number of mini slots) forming the minimum time unit of the scheduling may be controlled.

A TTI having a time length of 1 ms may be referred to as a usual TTI (TTI in 3GPP Rel. 8 to 12), a normal TTI, a long TTI, a usual subframe, a normal subframe, a long subframe, a slot, and the like. A TTI that is shorter than the usual TTI may be referred to as a shortened TTI, a short TTI, a partial TTI (or fractional TTI), a shortened subframe, a short subframe, a mini slot, a sub-slot, a slot, and the like.

Note that, the long TTI (for example, the usual TTI, subframe, and the like) may be replaced with a TTI having a time length longer than 1 ms, and the short TTI (for example, the shortened TTI and the like) may be replaced with a TTI having a TTI length shorter than the TTI length of the long TTI and not shorter than 1 ms.

A Resource Block (RB) is a resource allocation unit of the time domain and frequency domain, and may include one or a plurality of consecutive subcarriers in the frequency domain. The number of subcarriers included in the RB may be the same regardless of the numerology, and may be 12, for example. The number of subcarriers included in the RB may be determined on the basis of the numerology.

Furthermore, the RB may include one or a plurality of symbols in the time domain, and have the length of one slot, one mini slot, one subframe, or one TTI. One TTI, one subframe, and the like may include one or a plurality of resource blocks.

Note that, one or a plurality of RBs may be referred to as a physical resource block (physical RB (PRB)), a SubCarrier Group (SCG), a Resource Element Group (REG), a PRB pair, an RB pair, and the like.

Furthermore, the resource block may include one or a plurality of Resource Elements (REs). For example, one RE may be a radio resource domain of one subcarrier and one symbol.

A Bandwidth Part (BWP) (which may be referred to as partial bandwidth and the like) may represent a subset of consecutive common resource blocks (RBs) for certain numerology in a certain carrier. Here, the common RB may be specified by an index of the RB based on a common reference point of the carrier. The PRB may be defined in a certain BWP and numbered within the BWP.

The BWP may include a BWP for UL (UL BWP) and a BWP for DL (DL BWP). For the UE, one or a plurality of BWPs may be configured within one carrier.

At least one of the configured BWPs may be active, and it is not necessary to assume that the UE transmits and receives a given signal/channel outside the active BWP.

Note that, a cell, a carrier, and the like in the present disclosure may be replaced with a BWP.

Note that, the structures of the radio frame, subframe, slot, mini slot, symbol, and the like described above are merely examples. For example, configurations may be variously changed, such as the number of subframes included in the radio frame, the number of slots per subframe or radio frame, the number of mini slots included in the slot, the number of symbols and RBs included in the slot or mini slot, the number of subcarriers included in the RB, and the number of symbols, the symbol length, and cyclic prefix (CP) length in the TTI.

Furthermore, the information and parameters described in the present disclosure may be represented in absolute values, represented in relative values with respect to given values, or represented using other corresponding information. For example, the radio resource may be indicated by a given index.

The names used for the parameters and the like in the present disclosure are not limited names in any respect. Moreover, an equation and the like using these parameters may differ from those explicitly disclosed in the present disclosure. Since various channels (Physical Uplink Control Channel (PUCCH), Physical Downlink Control Channel (PDCCH), and the like) and information elements may be identified by any suitable names, the various names allocated to these various channels and information elements are not limited names in any respect.

The information, signals, and the like described in the present disclosure may be represented using any of various different technologies. For example, the data, instruction, command, information, signal, bit, symbol, chip, and the like that may be referred to throughout the above description may be represented by the voltage, current, electromagnetic wave, magnetic field or magnetic particle, optical field or photon, or any combination thereof.

Furthermore, the information, signals, and the like may be output in at least one of a direction from a higher layer to a lower layer and a direction from the lower layer to the higher layer. The information, signals, and the like may be input and output via a plurality of network nodes.

The information, signals, and the like that are input and output may be stored in a specific location (for example, in a memory), or may be managed using a management table. The information, signals, and the like to be input and output can be overwritten, updated, or appended. The information, signals, and the like that are output may be deleted. The information, signals, and the like that are input may be transmitted to other apparatuses.

The notification of information may be performed using other methods without being limited to the aspects/embodiments described in the present disclosure. For example, the notification of information in the present disclosure may be performed by using physical layer signaling (for example, Downlink Control Information (DCI), Uplink Control Information (UCI)), higher layer signaling (for example, Radio Resource Control (RRC) signaling, broadcast information (Master Information Block (MIB), System Information Block (SIB), or the like), Medium Access Control (MAC) signaling), and another signal, or a combination thereof.

Note that, the physical layer signaling may be referred to as Layer 1/Layer 2 (L1/L2) control information (L1/L2 control signal), L1 control information (L1 control signal), and the like. Furthermore, the RRC signaling may be referred to as an RRC message, and may be, for example, an RRC Connection Setup message, an RRC Connection Reconfiguration message, and the like. Furthermore, notification of the MAC signaling may be given by using, for example, a MAC Control Element (MAC CE).

Furthermore, notification of given information (for example, notification of "being X") does not necessarily have to be explicit, and may be given implicitly (for example, by not giving notification of the given information or by notification of other information).

Judging may be performed by a one-bit value (0 or 1), by a boolean indicated by true or false, or by comparison of numerical values (for example, comparison with a given value).

Regardless of whether software is referred to as software, firmware, middleware, microcode, or hardware description language, or referred to by other names, this should be interpreted broadly, to mean an instruction, an instruction set, a code, a code segment, a program code, a program, a subprogram, a software module, an application, a software application, a software package, a routine, a subroutine, an object, an executable file, an execution thread, a procedure, a function, and the like.

Furthermore, the software, instruction, information, and the like may be transmitted and received via transmission media. For example, when software is transmitted from a website, a server, or other remote sources by using at least one of wired technology (coaxial cable, optical fiber cable, twisted-pair, Digital Subscriber Line (DSL), and the like) or radio technology (infrared radiation, microwave, and the like), at least one of the wired technology or the radio technology is included in the definition of transmission media.

The terms "system" and "network" used in the present disclosure may be used interchangeably. The "network" may mean an apparatus (for example, a base station) included in the network.

In the present disclosure, the terms such as "precoding", "precoder", "weight (precoding weight)", "Quasi-Co-Location (QCL)", "Transmission Configuration Indication state (TCI state)", "spatial relation", "spatial domain filter", "transmission power", "phase rotation", "antenna port", "antenna port group", "layer", "number of layers", "rank", "resource", "resource set", "resource group", "beam", "beam width", "beam angle", "antenna", "antenna element", and "panel" may be used interchangeably.

In the present disclosure, the terms such as "Base Station (BS)", "radio base station", "fixed station", "NodeB", "eNodeB (eNB)", "gNodeB (gNB)", "access point", "Transmission Point (TP)", "Reception Point (RP)", "Transmission/Reception Point (TRP)", "panel", "cell", "sector", "cell group", "carrier", and "component carrier" may be used interchangeably. The base station may also be referred to by a term such as a macro cell, a small cell, a femto cell, a pico cell and the like.

The base station may accommodate one or a plurality of (for example, three) cells. When a base station accommodates a plurality of cells, the entire coverage area of the base station can be partitioned into multiple smaller areas, and a communication service can also be provided for each smaller area through base station subsystems (for example, indoor small base stations (Remote Radio Heads (RRHs))). The term "cell" or "sector" refers to all or part of the coverage area of at least one of the base station or base station subsystem that provides the communication service within this coverage.

In the present disclosure, the terms "Mobile Station (MS)", "user terminal", "User Equipment (UE)", "terminal", and the like may be used interchangeably.

A mobile station may be referred to as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other appropriate terms.

At least one of the base station or mobile station may be referred to as a transmission apparatus, a reception apparatus, a radio communication apparatus, and the like. Note that, at least one of the base station or mobile station may be a device mounted on a moving object, a moving object itself, and the like. The moving object may be a transportation (for example, a car, an airplane, and the like), an unmanned moving object (for example, a drone, an autonomous car, and the like), or a (manned or unmanned) robot. Note that, at least one of the base station or the mobile station also includes an apparatus that does not necessarily move during a communication operation. For example, at least one of the base station or mobile station may be an Internet of Things (IoT) device such as a sensor.

Furthermore, the base station in the present disclosure may be replaced with the user terminal. For example, each aspect/embodiment of the present disclosure may be applied to a configuration in which communication between the base station and the user terminal is replaced with communication between a plurality of user terminals (which may be referred to as, for example, Device-to-Device (D2D), Vehicle-to-Everything (V2X), and the like). In this case, the user terminal 20 may have the function of the base station 10 described above. Furthermore, the terms such as "up" and "down" may be replaced with the term corresponding to the terminal-to-terminal communication (for example, "side"). For example, an uplink channel, a downlink channel, and the like may be replaced with a side channel.

Similarly, the user terminal in the present disclosure may be replaced with a base station. In this case, the base station 10 may have the function of the user terminal 20 described above.

Certain operations described in the present disclosure to be performed by the base station may, in some cases, be performed by their upper nodes. In a network including one or a plurality of network nodes including the base station, it is clear that various operations performed to communicate with terminals may be performed by the base station, one or a plurality of network nodes other than the base station (for example, Mobility Management Entity (MME), Serving-Gateway (S-GW), and the like are conceivable, but there is no limitation), or a combination thereof.

Each aspect/embodiment described in the present disclosure may be used alone, used in a combination, and switched in association with execution. Furthermore, the order of the processing procedures, sequences, flowcharts, and the like of each aspect/embodiment described in the present disclosure may be changed as long as there is no contradiction. For example, regarding the method described in the present disclosure, elements of various steps are presented using an exemplary order, and the order is not limited to the presented specific order.

Each aspect/embodiment described in the present disclosure may be applied to a system using Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), Future Radio Access (FRA), New Radio Access Technology (New-RAT), New Radio (NR), New radio access (NX), Future generation radio access (FX), Global System For Mobile Communications (GSM (registered trademark)), CDMA2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), other appropriate radio communication methods, and a next generation system extended on the basis of these. Furthermore, a plurality of systems may be combined to be applied (for example, a combination of LTE or LTE-A and 5G).

The term "on the basis of" used in the present disclosure does not mean "only on the basis of" unless otherwise specified. In other words, the term "on the basis of" means both "only on the basis of" and "at least on the basis of".

Reference to elements with designations such as "first", "second", and the like used in the present disclosure does not generally limit the quantity or order of those elements. These designations may be used in the present disclosure as a convenient method of distinguishing between two or more elements. Thus, the reference to the first and second elements does not mean that only two elements may be adopted, or that the first element must precede the second element in a certain manner.

The term "determining" used in the present disclosure may include a wide variety of operations. For example, "determining" may be regarded as "determining" of judging, calculating, computing, processing, deriving, investigating, looking up, search, inquiry (for example, looking up in a table, database, or another data structure), ascertaining, and the like.

Furthermore, "determining" may be regarded as "determining" of receiving (for example, receiving of information), transmitting (for example, transmitting of information), input, output, accessing (for example, accessing to data in a memory), and the like.

Furthermore, "determining" may be regarded as "determining" of resolving, selecting, choosing, establishing, comparing, and the like. In other words, "determining" may be regarded as "determining" of a certain operation.

Furthermore, "determining" may be replaced with "assuming", "expecting", "considering", and the like.

The terms "connected" and "coupled" used in the present disclosure, or any variation of these terms mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be replaced with "access".

In the present disclosure, when two elements are connected together, it is conceivable that the two elements are "connected" or "coupled" to each other by using one or more electrical wires, cables, printed electrical connections, and the like, and, as some non-limiting and non-inclusive examples, by using electromagnetic energy having wavelengths in the radio frequency region, microwave region, or optical (both visible and invisible) region, or the like.

In the present disclosure, the terms "A and B are different" may mean "A and B are different from each other". Note that, the terms may mean that "A and B are each different from C". The terms such as "separate", "coupled", and the like may be interpreted similarly to "different".

When "include", "including", and variations of these are used in the present disclosure, these terms are intended to be inclusive similarly to the term "comprising". Moreover, the term "or" used in the present disclosure is intended to be not an exclusive-OR.

In the present disclosure, when articles are added by translation, for example, as "a", "an", and "the" in English, the present disclosure may include that nouns that follow these articles are plural.

In the above, the invention according to the present disclosure has been described in detail; however, it is obvious to those skilled in the art that the invention according to the present disclosure is not limited to the embodiments described in the present disclosure. The invention according to the present disclosure can be implemented as a corrected and modified mode without departing from the spirit and scope of the invention defined on the basis of the description of the claims. Thus, the description of the present disclosure is provided for the purpose of exemplification and explanation, and has no limitative meaning to the invention according to the present disclosure.

The invention claimed is:

1. A terminal comprising:
   a receiver that receives a Medium Access Control Control Element (MAC CE) for specifying two or more Transmission Configuration Indicator (TCI) states from among a plurality of TCI states that are configured for a Control Resource Set (CORESET) by using a higher layer signaling; and
   a processor that uses the two or more TCI states for reception of a Downlink Control Information (DCI) on a Physical Downlink Control Channel (PDCCH), the DCI scheduling a Physical Downlink Shared Channel (PDSCH),
   wherein when the DCI indicates two TCI states for the PDSCH, the processor uses the two TCI states, indicated by the DCI, for reception of the PDSCH, and
   when the DCI does not indicate the two TCI states, the processor uses the two or more TCI states, used for the reception of the DCI, for reception of the PDSCH.

2. The terminal according to claim 1, wherein when the higher layer signaling does not configure a TCI state for the CORESET, the processor uses, for the CORESET, a TCI state used for another CORESET.

3. A radio communication method for a terminal comprising:
   receiving a Medium Access Control Control Element (MAC CE) for specifying two or more Transmission Configuration Indicator (TCI) states from among a plurality of TCI states that are configured for a Control Resource Set (CORESET) by using a higher layer signaling; and
   using the two or more TCI states for reception of a Downlink Control Information (DCI) on a Physical Downlink Control Channel (PDCCH), the DCI scheduling a Physical Downlink Shared Channel (PDSCH),
   wherein when the DCI indicates two TCI states for the PDSCH, the terminal uses the two TCI states, indicated by the DCI, for reception of the PDSCH, and
   when the DCI does not indicate the two TCI states, the terminal uses the two or more TCI states, used for the reception of the DCI, for reception of the PDSCH.

4. A base station comprising:
   a transmitter that transmits a Medium Access Control Control Element (MAC CE) for specifying two or more Transmission Configuration Indicator (TCI) states from among a plurality of TCI states that are configured for a Control Resource Set (CORESET) by using a higher layer signaling; and
   a processor that uses the two or more TCI states for transmission of a Downlink Control Information (DCI)

on a Physical Downlink Control Channel (PDCCH), the DCI scheduling a Physical Downlink Shared Channel (PDSCH), wherein when the DCI indicates two TCI states for the PDSCH, the two TCI states indicated by the DCI is used for reception of the PDSCH, and when the DCI does not indicate the two TCI states, the two or more TCI states used for the reception of the DCI is used for reception of the PDSCH.

5. A system comprising a terminal and a base station, wherein the terminal comprises:
- a receiver that receives a Medium Access Control Control Element (MAC CE) for specifying two or more Transmission Configuration Indicator (TCI) states from among a plurality of TCI states that are configured for a Control Resource Set (CORESET) by using a higher layer signaling; and
- a processor that uses the two or more TCI states for reception of a Downlink Control Information (DCI) on a Physical Downlink Control Channel (PDCCH), the DCI scheduling a Physical Downlink Shared Channel (PDSCH), when the DCI indicates two TCI states for the PDSCH, the processor uses the two TCI states, indicated by the DCI, for reception of the PDSCH, when the DCI does not indicate the two TCI states, the processor uses the two or more TCI states, used for the reception of the DCI, for reception of the PDSCH, and the base station comprises:
- a transmitter that transmits the MAC CE and transmits the PDCCH.

\* \* \* \* \*